(12) United States Patent
Abiru et al.

(10) Patent No.: US 7,588,709 B2
(45) Date of Patent: Sep. 15, 2009

(54) CASTING DEVICE, SOLUTION CASTING APPARATUS AND SOLUTION CASTING METHOD

(75) Inventors: Daisaku Abiru, Minami-ashigara (JP); Atsuo Futami, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/839,175

(22) Filed: Aug. 15, 2007

(65) Prior Publication Data

US 2008/0042315 A1 Feb. 21, 2008

(30) Foreign Application Priority Data

Aug. 16, 2006 (JP) .............................. 2006-221783

(51) Int. Cl.
*B29C 47/16* (2006.01)
(52) U.S. Cl. .............. 264/216; 425/376.1; 425/381; 425/382.4; 425/461; 425/466; 425/467
(58) Field of Classification Search ................. 264/216, 264/28, 234, 232; 425/382, 376.1, 382 R, 425/461, 381, 382.4, 465, 466, 467
See application file for complete search history.

(56) References Cited

U.S. PATENT DOCUMENTS

| 5,105,760 A | * | 4/1992 | Takahashi et al. ............ 118/410 |
| 5,679,387 A | * | 10/1997 | Cloeren et al. .............. 425/381 |
| 2004/0104496 A1 | * | 6/2004 | Arai et al. ..................... 264/28 |

FOREIGN PATENT DOCUMENTS

| JP | 2687260 B2 | 8/1997 |
| JP | 2002-103361 A | 4/2002 |
| JP | 2002-337173 A | 11/2002 |

* cited by examiner

*Primary Examiner*—Christina Johnson
*Assistant Examiner*—Magali P Théodore
(74) *Attorney, Agent, or Firm*—Sughrue Mion, PLLC

(57) ABSTRACT

In a casting process of a film production, a casting dope is discharged through an outlet of a casting die. In the casting die, lip plates and inner deckle plates are arranged such that a lower end of each inner deckle plates may be form a protrusion at a side edge of the outlet of the casting die. Each protrusion length from a bottom of the lip plate is at most 9 μm. Thus the retaining of the casting dope near the outlet through a dope passage in the casting die is reduced, and therefore the skinning doesn't occur in the casting dope.

9 Claims, 10 Drawing Sheets

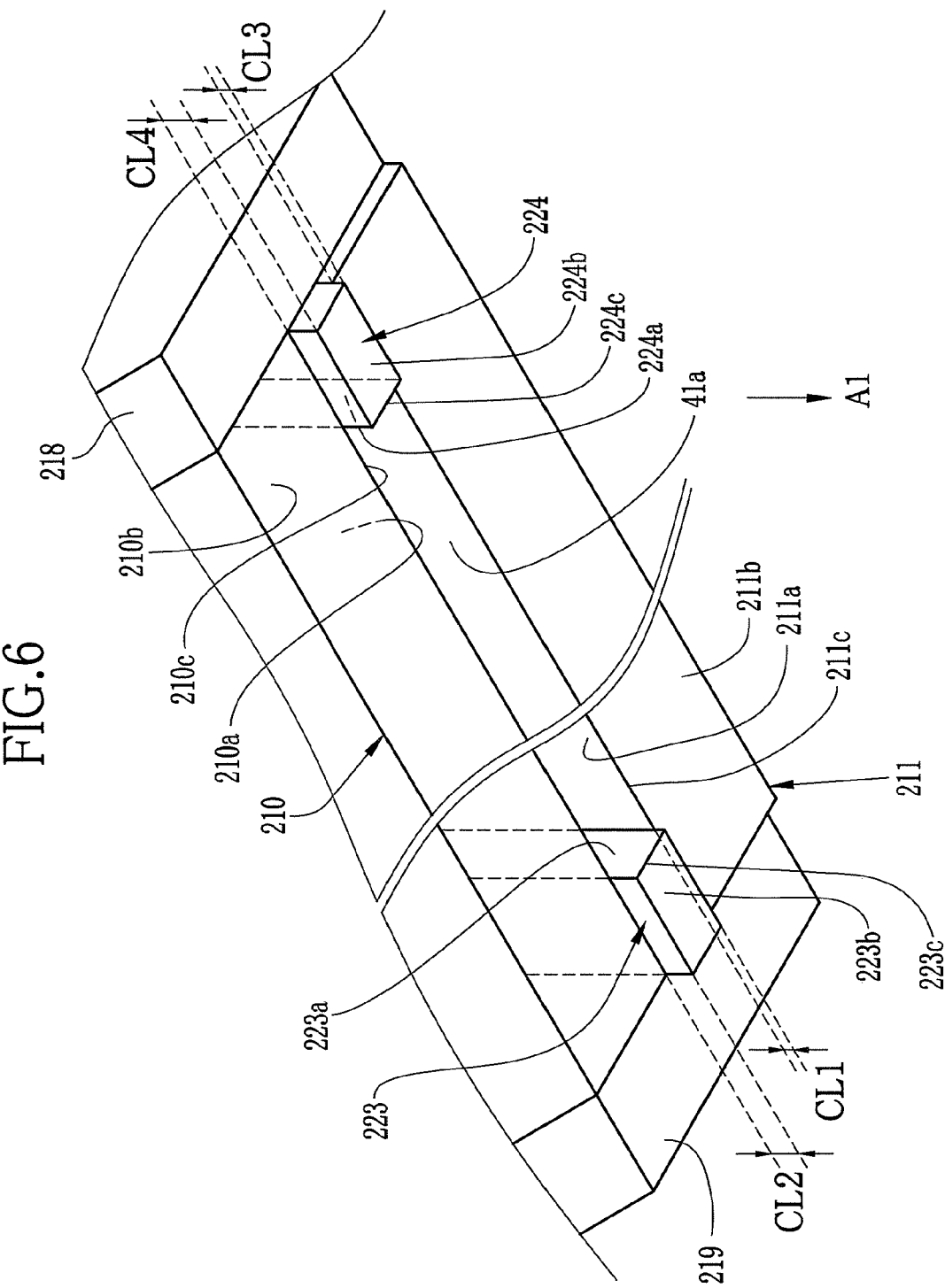

CASTING DEVICE, SOLUTION CASTING APPARATUS AND SOLUTION CASTING METHOD

BACKGROUND OF THE INVENTION

1. Field of the Invention

The present invention relates to a casting device for discharging a viscoelastic fluid, a solution casting apparatus, and a solution casting method, and especially, a casting device for discharging a dope which contains a polymer as a raw material of a film, and a solution casting apparatus for and a solution casting method of producing a film from the dope.

2. Description Related to the Prior Art

A polymer film (hereinafter, film) is variously used as an optical functional film, since it being excellent in the excellent transparency and flexibility, and further since the film thickness can be decreased. Among the polymer film, there is a cellulose acylate film formed from cellulose acylate, and especially, a cellulose triacetate (hereinafter TAC) is used among the cellulose acylate, so as to form a TAC film. The TAC film is used as a film base of a film material, such as a photosensitive material, since having strength and inflammability. Note that, among the TAC, the averaged acetylation degree is preferably in the range of 57.5% to 62.5%. Further, the TAC film is excellent in optical isotropy, and therefore used as a protective film for a polarizing filter, an optical compensation film (for example, a wide view film and the like) in a liquid crystal display whose market becomes larger in recent years.

As a method of producing the film, there are a melt extrusion method and a solution casting method. In the melt extrusion method, the polymer is heated and molten, and then the molten polymer is extruded from an extruder to form the film. The melt extrusion method has merits in the high productivity and the low cost for furnishing the equipments. However, in the melt extrusion method, it is difficult to control the film thickness finely, and since stripes (named die line) is formed on the film, the produced film hardly has a high quality adequate to the optical film. Otherwise, in the solution casting method, a polymer is dissolved to a solvent, and thus a dope as a polymer solution is prepared. Then the dope is cast from a casting die onto a support so as to form a casting film. When the casting film has a self-supporting property, the casting film is peeled as a wet film from the support. Thereafter, in a tenter dryer, while both side edge portions of the wet film is clipped, The wet film is stretched and a relaxation thereof is made. At the same time, the wet film is dried. After the drying is made enough, the wet film is wound up as the film. In the solution casting method, the produced film is more excellent in the optical isotropy and the thickness uniformity than, and contains less foreign material than in the melt extrusion method. Therefore, the solution casting method is well known as a preferable method of producing the film, especially the optical film.

In following, outlines of a casting process in the solution casting method will be explained. As shown in FIG. 12 illustrating a discharging process, a casting die 300 as the casting device discharges a dope 301 onto a running support 302. For the casting, the dope 301 is spread on the support 302 by the running of the support 302 in a running direction X1. Thus a casting film 303 is formed.

The casting die 300 includes a dope outlet 300a through which the dope 301 is discharged. As shown in FIG. 13, the casting die 300 is provided with lip plates 310, 311, side plates 312, 313, and inner deckle plates 314, 315, while the lip plates 310, 311 and the inner deckle plates 314, 315 are positioned so as to form the dope outlet 300a and respectively have contact face 310a, 311a, 314a, 315a for contacting the dope 301.

When the casting of the casting dope 301 onto the support 302 is made, the casting dope 301 is discharged through the dope outlet 30a from the casting die 300, so as to form a dope bead between the outlet 300a and the support 302. However, the retaining of the casting dope 301 easily occurs near both sides of the outlet 300a on the inner deckle plates 314, 315, and the casting dope 301 in retaining is easily dried to form a skinning. Then the skinning grows to have an icicle form, which disturbs the flow of the casting dope 301 through the outlet 301. Thus, the formation of the casting film 303 and a bead of the discharged casting dope is inhibited. Therefore, in the case that the skinning occurs, the casting is removed by decreasing the casting speed. In this case, it is necessary to make the casting speed lower such that the casting film and the bead may not be cut off. As a result, the skinning in the casting process causes the extremely low productivity.

Conventionally, as the method of preventing the skinning, there are a method of providing a solvent for preventing the dry of the casting dope while the dope is dissolvable to the solvent, a method of preventing the retaining of the casting dope near the outlet. Japanese Patent Publication No. 2,687, 260 and Japanese Patent Laid-Open Publication No. 2002-337173 disclose methods of preventing the skinning, which are hereinafter named a flowing down method. In these methods, while the casting dope is discharged from the casting outlet, a solvent (dichloromethylene and the like) is flown down onto both side edges of the discharged dope, each of which is disposed slightly inside from outlet edges of the casting die. In Japanese Patent-Laid Open Publication No. 2002-103361, according to the sectional shape of both side edges of a lip end of the casting die, the skinning is prevented while an angle between a lip faces and a lip side face is controlled to at least 120°.

However, in the casting process, the wind speed near the outlet 300a and the supply rate of the solvent are hardly controlled to the predetermined values. In the methods of the publications No. 2687260 and No. 2002-337173, if the controls of the wind speed and the supply rate are not made adequately, the solvent flowing down disperses over the support, which causes the planarity defect of the film, and the solvent is supplied excessively, which causes the adhesion of the foreign materials to the support. If the adhesion of the foreign materials occurs, the support must be cleansed, and therefore the productivity becomes lower. Further, in accordance with the extremely growth of the demand of the liquid crystal display, it is required to progress the high technology of the solution casting method. However, if the production speed is made higher, the controls of the wind speed and the temperature near the outlet 300a are more hardly controlled. Therefore, it is difficult to apply the above flowing down methods to the solution casting method. Further, in the method of the publication No. 2002-103361, the outlet is hardly formed at such a processing accuracy that the skinning may be prevented. Therefore, the effect of preventing the skinning is not expected enough in the conventional art.

In the researches and keen examinations, the inventor found that the retaining causing the skinning is prevented if the lower ends of the lip plates 310, 311 and the inner deckle plates 314, 315 are on an imaginary face, namely if the displacement among the lip plates 310, 311 and the inner deckle plates 314, 315 in a flow-out direction (referred to as a discharging direction) of the dope 301 is in the predetermined value.

SUMMARY OF THE INVENTION

An object of the present invention is to provide a casting device for preventing the generation of the skinning in the casting process.

Another object of the present invention is to provide a solution casting apparatus having high productivity.

Still another object of the present invention is to provide a solution casting method having high productivity.

In order to achieve the object and the other object, a casting device for flowing out a dope from a slit includes a pair of first slit members forming first walls of the slit and a pair of second slit member forming second walls of the slit, and the first walls extends in a lengthwise direction of the slit and the second walls extends in a widthwise direction of the slit. A protrusion length of a protrusion is at most 9 μm upon providing for the second slit member with the protrusion protruding from the first slit member in a flow-out direction of the dope or for the first slit member with the protrusion protruding from the second slit member in the flow-out direction.

In a preferable embodiment of the casting device, the pair of the first slit members is constructed of a pair of lip plates disposed oppositely, so as to form a distance of a predetermined length, and the pair of the second slit members is constructed of inner deckle plates. The side plates are attached to outer edges of the lip plates, and the inner deckle plates are disposed in a space surrounded by the lip plates and the side plates, so as to contact to the side plates. In a particularly preferable embodiment, the lip plate and the side plate are formed of stainless and the inner deckle plate is formed of ceramics.

In a preferable embodiment of the casting device, each of the second slit members has a widening surface such that a flow width of said dope may be larger in a downstream side of a flow of said dope.

A solution casting apparatus of the present invention includes a running support, a casting device for flowing a dope onto the support so as to form a casting film, and a drying device for drying the casting film peeled from the support such that a film may be obtained. The casting device includes a pair of first slit members forming first walls of the slit and a pair of second slit member forming second walls of the slit, and the first walls extends in a lengthwise direction of the slit and the second walls extends in a widthwise direction of the slit. A protrusion length of a protrusion is at most 9 μm upon providing for the second slit member with the protrusion protruding from the first slit member in a flow-out direction of the dope or for the first slit member with the protrusion protruding from the second slit member in the flow-out direction.

In a solution casting method of the present invention, a casting device is provided for flowing out a dope from a slit, a support is run, and the dope is flown out from the slit so as to form a casting film. The casting device includes a pair of first slit members forming first walls of the slit and a pair of second slit member forming second walls of the slit, and the first walls extends in a lengthwise direction of the slit and the second walls extends in a widthwise direction of the slit. A protrusion length of a protrusion is at most 9 μm upon providing for the second slit member with the protrusion protruding from the first slit member in a flow-out direction of the dope or for the first slit member with the protrusion protruding from the second slit member in the flow-out direction.

According to the present invention, the dope containing the polymer is discharged from the outlet of the casting device, while the protrusion protruding in the flow-out direction is provided in both side edges of the outlet. Further the protrusion length is at most 9 μm. Therefore the retaining of the dope in the outlet is prevented, and thus the generation of the skinning is prevented. Furthermore, in the solution casting apparatus the solution casting method, in which the casting device is used, it is not necessary to remove the skinning which has been formed in the casting process in the prior art. Thus the productivity of the film production becomes higher in the solution casting method.

BRIEF DESCRIPTION OF THE DRAWINGS

The above objects and advantages of the present invention will become easily understood by one of ordinary skill in the art when the following detailed description would be read in connection with the accompanying drawings.

FIG. 6 is a perspective view of a bottom of the casting die;

PREFERRED EMBODIMENTS OF THE INVENTION

Figure 1:
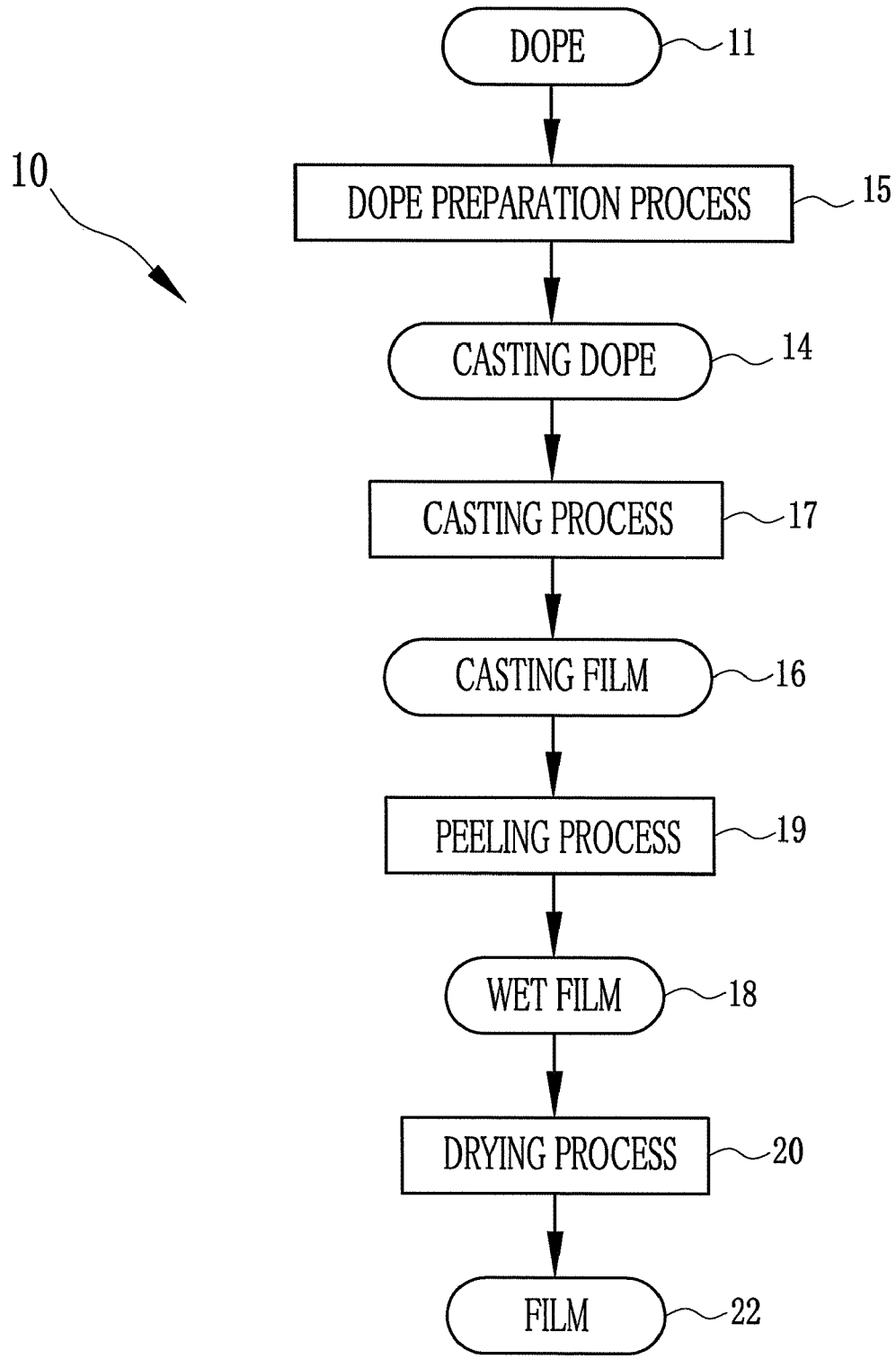
FIG. 1 is a flow chart illustrating processes in a film production line to which the present invention is applied.

In followings, the preferred embodiments will be explained in detail. However, the present invention is not restricted in the description.

[Raw Materials]

As polymer of this embodiment, the already known polymer to be used for the film production may be used. For example, cellulose acylate is preferable, and triacetyl cellulose (TAC) is especially preferable. It is preferable in cellulose acylate that the degree of substitution of acyl groups for hydrogen atoms on hydroxyl groups of cellulose preferably satisfies all of following formulae (I)-(III). In these formulae (I)-(III), A is the degree of substitution of the acetyl groups for the hydrogen atoms on the hydroxyl groups of cellulose, and B is the degree of substitution of the acyl groups for the hydrogen atoms while each acyl group has carbon atoms whose number is from 3 to 22. Note that at least 90 wt. % of TAC is particles having diameters from 0.1 mm to 4 mm.

$$2.5 \leq A+B \leq 3.0 \tag{I}$$

$$0 \leq A \leq 3.0 \tag{II}$$

$$0 \leq B \leq 2.9 \tag{III}$$

Further, polymer to be used in the present invention is not restricted in cellulose acylate.

A glucose unit constructing cellulose with β-1,4 bond has the free hydroxyl groups on $2^{nd}$, $3^{rd}$ and $6^{th}$ positions. Cellulose acylate is polymer in which, by esterification, the hydrogen atoms on the part or all of the hydroxyl groups are substituted by the acyl groups having at least two carbon atoms. The degree of acylation is the degree of the esterification of the hydroxyl groups on the $2^{nd}$, $3^{rd}$, $6^{th}$ positions. In each hydroxyl group, if the esterification is made at 100%, the degree of acylation is 1.

Herein, if the acyl group is substituted for the hydrogen atom on the $2^{nd}$ position in a glucose unit, the degree of the acylation is described as DS2 (the degree of substitution by acylation on the $2^{nd}$ position), and if the acyl group is substituted for the hydrogen atom on the $3^{rd}$ position in the glucose unit, the degree of the acylation is described as DS3 (the degree of substitution by acylation on the $3^{rd}$ position). Further, if the acyl group is substituted for the hydrogen atom on the $6^{th}$ position in the glucose unit, the degree of the acylation is described as DS6 (the degree of substitution by acylation on the $6^{th}$ position). The total of the degree of acylation, DS2+DS3+DS6, is preferably 2.00 to 3.00, particularly 2.22 to 2.90, and especially 2.40 to 2.88. Further, DS6/(DS2+DS3+DS6) is preferably at least 0.28, particularly at least 0.30, and especially 0.31 to 0.34.

In the present invention, the number and sort of the acyl groups in cellulose acylate may be only one or at least two. If there are at least two sorts of acyl groups, one of them is preferable the acetyl group. If the hydrogen atoms on the $2^{nd}$, $3^{rd}$ and $6^{th}$ hydroxyl groups are substituted by the acetyl groups, the total degree of substitution is described as DSA, and if the hydrogen atoms on the $2^{nd}$, $3^{rd}$ and $6^{th}$ hydroxyl groups are substituted by the acyl groups other than acetyl groups, the total degree of substitution is described as DSB. In this case, the value of DSA+DSB is preferably 2.22 to 2.90, especially 2.40 to 2.88. Further, DSB is preferably at least 0.30, and especially at least 0.7. According to DSB, the percentage of the substitution on the $6^{th}$ position to that on the $2^{nd}$, $3^{rd}$ and $6^{th}$ positions is at least 20%. The percentage is preferably at least 25%, particularly at least 30%, and especially at least 33%. Further, DSA+DSB of the $6^{th}$ position of the cellulose acylate is preferably at least 0.75, particularly at least 0.80, and especially at least 0.85. When these sorts of cellulose acylate are used, a solution (or dope) having preferable solubility can be produced, and especially, the solution having preferable solubility to the non-chlorine type organic solvent can be produced. Further, when the above cellulose acylate is used, the produced solution has low viscosity and good filterability. Note that the dope contains a polymer and a solvent for dissolving the polymer. Further, if necessary, an additive is added to the dope.

The cellulose as the raw material of the cellulose acylate may be obtained from one of the pulp and the linter.

In cellulose acylate, the acyl group having at least 2 carbon atoms may be aliphatic group or aryl group. Such cellulose acylate is, for example, alkylcarbonyl ester and alkenylcarbonyl ester of cellulose. Further, there are aromatic carbonyl ester, aromatic alkyl carbonyl ester, or the like, and these compounds may have substituents. As preferable examples of the compounds, there are propionyl group, butanoyl group, pentanoyl group, hexanoyl group, octanoyl group, decanoyl group, dodecanoyl group, tridecanoyl group, tetradecanyol group, hexadecanoyl group, octadecanoyl group, iso-butanoyl group, t-butanoyl group, cyclohexanecarbonyl group, oleoyl group, benzoyl group, naphthylcarbonyl group, cinamoyl group and the like. Among them, the particularly preferable groups are propionyl group, butanoyl group, dodecanoyl group, octadecanoyl group, t-butanoyl group, oleoyl group, benzoyl group, naphthylcarbonyl group, cinamoyl group and the like, and the especially preferable groups are propionyl group and butanoyl group.

Further, as solvents for preparing the dope, there are aromatic hydrocarbons (for example, benzene, toluene and the like), hydrocarbon halides (for example, dichloromethane, chlorobenzene and the like), alcohols (for example, methanol, ethanol, n-propanol, n-butanol, diethyleneglycol and the like), ketones (for example, acetone, methylethyl ketone and the like), esters (for example, methyl acetate, ethyl acetate, propyl acetate and the like), ethers (for example, tetrahydrofuran, methylcellosolve and the like) and the like. Note that the dope is a polymer solution or dispersion in which a polymer and the like is dissolved to or dispersed in the solvent. It is to be noted in the present invention that the dope is a polymer solution or a dispersion that is obtained by dissolving or dispersing the polymer in the solvent.

The solvents are preferably hydrocarbon halides having 1 to 7 carbon atoms, and especially dichloromethane. Then in view of the dissolubility of cellulose acylate, the peelability of a casting film from a support, a mechanical strength of a film, optical properties of the film and the like, it is preferable that one or several sorts of alcohols having 1 to 5 carbon atoms is mixed with dichloromethane. Thereat the content of the alcohols to the entire solvent is preferably in the range of 2 wt. % to 25 wt. %, and particularly in the range of 5 wt. % to 20 wt. %. Concretely, there are methanol, ethanol, n-propanol, isopropanol, n-butanol and the like. The preferable examples for the alcohols are methanol, ethanol, n-butanol, or a mixture thereof.

By the way, recently in order to reduce the effect to the environment to the minimum, the solvent composition when dichloromethane is not used is progressively considered. In order to achieve this object, ethers having 4 to 12 carbon atoms, ketones having 3 to 12 carbon atoms, esters having 3 to 12 carbons, and alcohols having 1 to 12 carbons are preferable, and a mixture thereof can be used adequately. For example, there is a mixture of methyl acetate, acetone, ethanol and n-butanol. These ethers, ketones, esters and alcohols may have the ring structure. Further, the compounds having at least two of functional groups in ethers, ketones, esters and alcohols (namely, —O—, —CO—, —COO— and —OH) can be used for the solvent.

Note that the detailed explanation of cellulose acylate is made from [0140] to [0195] in Japanese Patent Laid-Open Publication No. 2005-104148, and the description of this publication can be applied to the present invention. Note that the detailed explanation of the solvents and the additive materials of the additive (such as plasticizers, deterioration inhibitors, UV-absorptive agents, optical anisotropy controllers, dynes, matting agent, release agent, retardation controller and the like) is made from [0196] to [0516] in Japanese Patent Laid-Open Publication No. 2005-104148.

[Dope Production Method]

The dope is prepared from the raw materials. In the dope production line, there is a solvent tank for storing a solvent, a mixing tank for mixing a TAC and the solvent, a hopper for supplying the TAC to the mixing tank, and an additive tank for storing an additive. Further, there is a heating device for heating a swelling liquid which is obtained by mixing the TAC and the solvent as described later in detail, a temperature controller for controlling the temperature of the dope which is obtained from the swelling liquid, and a filtration device. Furthermore, there are a recovering device for recovering the solvent vapor and a refining device for refining the recovered solvent. The dope production line is connected through a stock tank 39 (see, FIG. 2) to a film production line 40.

The solvent is sent to the mixing tank by opening a bulb. Then a necessary amount of the TAC in the hopper is measured and sent with measuring to a mixing tank. Then a necessary amount of the additive solution is sent from the additive tank to the mixing tank. Note that if the additive is in the liquid state in the room temperature, it may be fed in the liquid state to the mixing tank without preparing for the additive solution. Otherwise, if the additive is in the solid state in the room temperature, it may be fed in the solid state to the mixing tank with use of a hopper and the like. If plural sorts of additive compounds are used, the additive containing the plural additive compounds may be accumulated in the additive tank altogether. Otherwise plural additive tanks may be used so as to contain the respective additive compounds, which are sent through independent pipes to the mixing tank.

In the above explanation, the solvent, TAC, the additive are sequentially sent to the mixing tank. However, the sending order is not restricted in it. For example, after the necessary amount of TAC is sent with measurement to the mixing tank, the feeding of the preferable amount of the solvent maybe performed. Further, it is not necessary that the additive is previously sent in the mixing tank, and they may be added to a mixture of TAC and the solvent.

The mixing tank is provided with a jacket covering over an outer surface of the mixing tank and first and second stirrer which are rotated by respective motors. The first stirrer preferably has an anchor blade, and the second stirrer is preferably an eccentric stirrer of a dissolver type. The inner temperature in the mixing tank is controlled with use of the heat transferring medium flowing in the jacket. The preferable inner temperature is in the range of −10° C. to 55° C. At least one of the first and second stirrers is adequately chosen for performing the rotation. Thus the swelling liquid in which TAC is swollen in the solvent is obtained. Note that the second stirrer may be omitted. However, as in this embodiment, the second stirrer is preferably provided.

The swelling liquid in the mixing tank is sent with use of pump to a heating device. Preferably, the heating device is a pipe with a jacket, and further pressurizes the swelling liquid. During only the heating or both of the heating and pressurizing of the swelling liquid, the dissolution of TAC proceeds such that a polymer solution may be obtained. Note that the polymer solution may be a solution in which the polymer is entirely dissolved and a swelling liquid in which the polymer is swollen. It is to be noted in this heat-dissolution method, the temperature of the swelling liquid is preferably in the range of 50° C. to 120° C. Instead of the heat-dissolution with use of the heating device, the swelling liquid may be cooled in the range of −100° C. to −30° C. so as to perform the dissolution, which is already known as the cool-dissolution method. In this embodiment, one of the heat-dissolution and cool-dissolution methods can be chosen in accordance with the properties of the materials, so as to control the solubility. Thus the dissolution of TAC to the solvent can be made enough. The polymer solution is fed to a temperature controlling device, so as to control the temperature nearly to the room temperature.

Then the filtration of the polymer solution is made with a filtration device, such that impurities may be removed from the polymer solution. The filter used in the filtration device preferably has an averaged nominal diameter of at most 100 μm. The flow rate of the filtration in the filtration device is preferably at least 50 litter/hr. The polymer solution after the filtration is, as shown in FIG. 1, accumulated as a dope 11 (see, FIG. 2) in the stock tank 39 in the film production line 40.

The polymer solution can be used as a dope for a film production, which will be explained. However, in the method in which the dissolution of TAC is performed after the preparation of the swelling liquid, if it is designated that a polymer solution of high concentration is produced, the time for production of such dope becomes longer. Consequently, the production cost becomes higher. Therefore, it is preferable that a polymer solution of the lower concentration than the predetermined value is prepared at first and then the concentrating of the polymer solution is made. In this embodiment, the polymer solution after the filtration is sent to the flushing device. In the flushing device, the solvent of the polymer solution is partially evaporated. The solvent vapor generated in the evaporation is condensed by a condenser (not shown) to a liquid state, and recovered by a recovering device (not shown). The recovered solvent is recycled by a recycling device (not shown) and reused. According to this method, the decrease of cost can be designated, since the production efficiency becomes higher and the solvent is reused.

The polymer solution after the concentrating as the above description is extracted from the flushing device through a pump. Further, in order to remove bubbles generated in the polymer solution, it is preferable to perform the defoaming treatment. As a defoaming method, there are many methods which are already known, for example, an ultrasonic irradiation method and the like. Then the polymer solution is fed to another filtration device, in which the undissolved materials are removed. Note that the temperature of the polymer solution in the filtration is preferably in the range of 0° C. to 200° C. Thus the polymer solution is accumulated as the dope 11 (see, FIG. 2) in the stock tank 39.

Thus a dope is produced the produced dope has the TAC concentration in the range of 5 wt. % to 40 wt. %. The TAC concentration is preferably in the range of 15 wt. % to 30 wt. %, and especially 17 wt. % to 25 wt. %. Further, the concentration of the additive (mainly plasticizers) is in the range of 1 wt. % to 20 wt. %, if the total solid content in the dope is 100 wt. %.

Note that the method of producing the polymer solution is disclosed in detail in [0517] to [0616] in Japanese Patent Laid-Open Publication No. 2005-104148, for example, the dissolution method and the adding methods of the materials, the raw materials and the additive in the solution casting method for forming the TAC film, the filtering method, the bubble removing method, and the like.

(Film Producing Process)

Now, a film producing process 10 will be explained. As shown in FIG. 1, the film producing process 10 includes a dope preparation process 15 for preparing a casting dope 14 from the dope 11 obtained in the above method, a casting process 17 for casting the casting dope 14 onto the support so as to form a casting film 16, a peeling process 19 for peeling from the support the casting film 16 as a wet film 18 when the casting film 16 has a self-supporting property, and a drying process 20 for drying the wet film 18 to a film 22. Note that a film winding process for winding the film 22 may be performed. Further, the wet film 18 is corresponding to the casting film peeled from the support in the present invention.

(Solution Casting Method)

In the followings, the film production line 40 for producing the film 22 from the dope 11 will be explained as an embodiment of the solution casting apparatus and the solution casting method of the present invention, in reference with FIG. 2. It is however to be noted that the present invention will not be restricted in FIG. 2. The film production line 40 includes the stock tank 39, a casting die 41, the back-up rollers 42, 43, a casting belt 44 as the support lapped over the back-up rollers 42, 43, a tenter dryer 45, an edge slitting device 46, a drying chamber 47, a cooling chamber 48, a winding chamber 49 and the like.

The stock tank 39 is provided with a motor 55 and a stirrer 56 to be rotated by the drive of the motor 55. The stock tank 39 is connected to the casting die 41 through a pipe 61 which has a pump 58, a filtration device 59 and a static mixer 60.

In the pipe 61, the additive liquid containing the matting agent and the UV absorbing agent is added to the dope 11, and then the static mixer 60 stirs the mixture of the dope 11 and the additive liquid such that a uniform mixture may be obtained as the casting dope 14.

The casting die 41 is used as the casting device of the casting dope 14, and has an outlet 41a (see, FIG. 3) for discharging the casting dope 14. The casting die 41 is disposed such that the outlet 41a may be opposite to the casting belt 44. Thus the casting dope 14 is discharged through the outlet 41a from the casting die 41 to the casting belt 44. Note that the explanation of the casting die 41 in detail will be made later.

Figure 2:
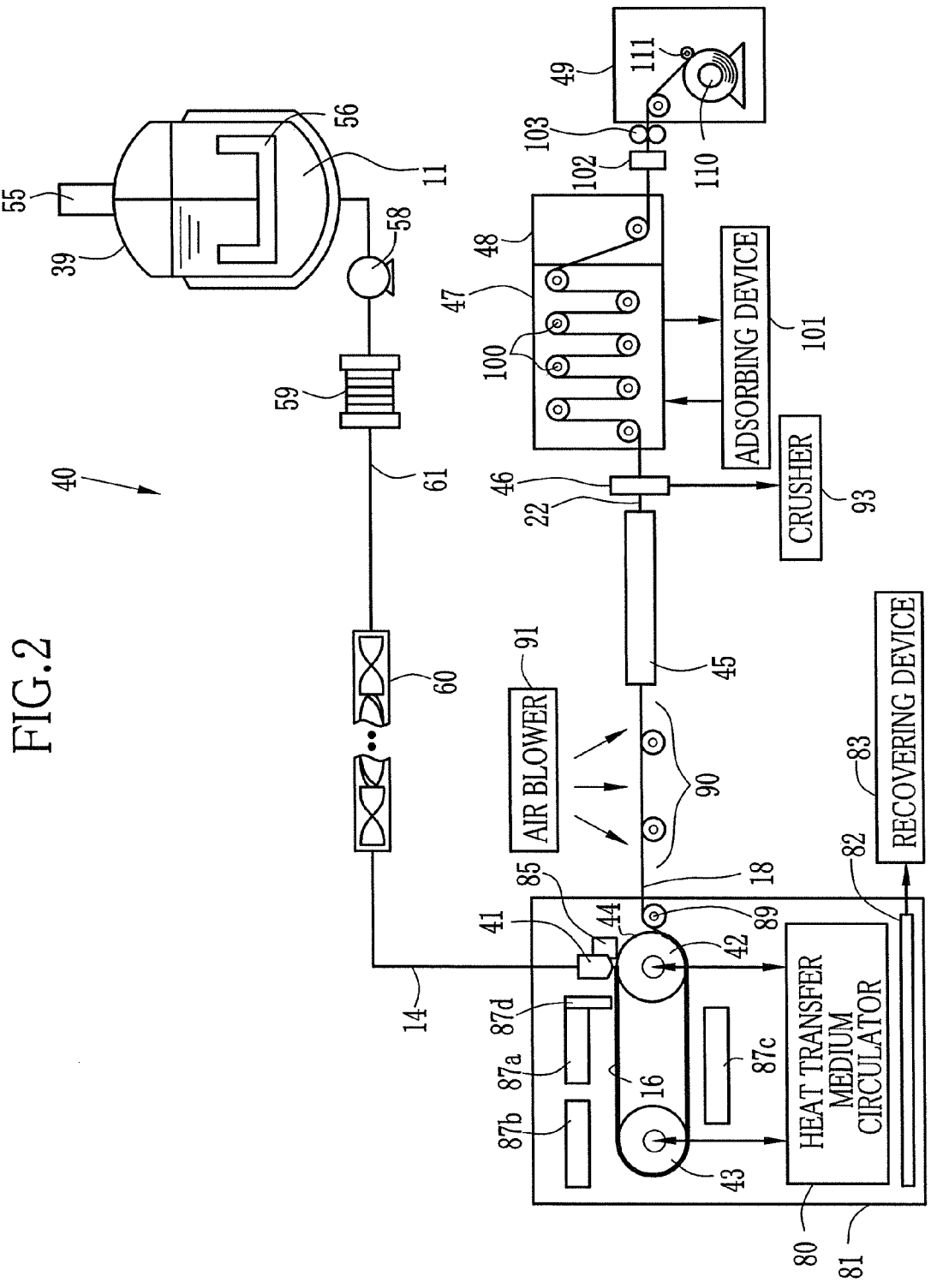
FIG. 2 is a schematic diagram of the film production line.

As shown in FIG. 2, the casting belt 44 is positioned below the casting die 41, and lapped on the back-up rollers 42, 43. When the back-up rollers 42, 43 are rotated by the driving device (not shown), and thus the casting belt 44 runs endlessly in accordance with the rotation of the back-up rollers 42, 43. Then the casting speed is preferably in the range of 10 m/min to 200 m/min. Further, the temperatures of the back-up rollers 42, 43 are controlled by a heat transfer medium circulator 80 for cycling a heat transfer medium. It is preferable that the surface temperature of the casting belt 44 is adjusted in the range of −20° C. to 40° C. by heat transmission from the back-up rollers 42, 43. In this embodiment, paths (not shown) of the heat transfer mediums are formed in the back-up rollers 42, 43, and the heat transfer mediums whose temperatures are controlled by the heat transfer medium circulator 80 pass through the paths. Thus the temperature of the back-up rollers 42, 43 are kept to the predetermined values.

The width and the length of the casting belt 44 are not restricted especially. However, it is preferably 1.1 to 2.0 times as large as the casting width. Preferably, the length is from 20 m to 200 m, and the thickness is from 0.5 mm to 2.5 mm. The surface is preferably polished so as to have a surface roughness at most 0.05 μm. The casting belt 44 is preferably made of stainless steel, and especially of SUS316 so as to have enough resistance of corrosion and strength. The thickness unevenness of the entire casting belt 44 is preferably at most 0.5%.

Note that it is possible to use one of the back-up rollers 42, 43 as support. In this case, the roller is preferably rotated at high accuracy such that a flutter of rotation may be at most 0.2 mm. Therefore the surface roughness is preferably at most 0.01 μm. Further, the chrome plating is preferably performed to the drum such that the drum may have enough hardness and endurance. As described above, it is preferable in the support that the surface defect must be reduced to be minimal. Concretely there are no pin hole of at least 30 μm, at most one pin hole in the range of 10 μm to 30 μm, and at most two pin holes of less than 10 μm per 1 m².

The casting die 41, the casting belt 44 and the like are included in a casting chamber 81. A temperature controlling device (not shown) is provided for controlling the inner temperature of the casting chamber 81 to the predetermined value, and a condenser 82 if provided for condensing organic solvent evaporated in the casting chamber 81. Further, outside the casting chamber 81, there is a recovering device 83 for recovering the condensed organic solvent. In this preferable embodiment, there is a decompression chamber 85 for controlling the pressure in the back side of a dope bead of the discharged casting dope. Thus the formation of the dope bead is stabilized.

In this embodiment, it is preferable to provide air blowers 87a, 87b, 87c for feeding a drying air for evaporating the solvent in the casting film 16 which is transported in accordance with the running of the casting belt 44. Further, an air shielding plate 87d is disposed close to the casting film 16 in the downstream side from the casting die 41. Although the drying wind causes to change surface conditions of the casting film 16 just after the formation, the air shielding plate 87d reduces the change of the surface conditions. Further, in the casting chamber, there is a passage for conveying the casting film 16 in accordance with the running of the casting belt 44. Close to the downstream passage, there is a roller 89 for peeling from the casting belt 44 the casting film 16 as the wet film 18. Then the wet film 18 is fed out from the casting chamber 81.

In the downstream side from the casting chamber 81, a transfer area 90 is provided. In the transfer area 90, there is an air blower 91 for feeding a drying air whose temperature is a predetermined value. Next to the transfer area 90, the wet film 18 is fed to the tenter dryer 45. In the tenter dryer 45, both side edge portions of the wet film 18 is held by clips or pins and the stretching in the widthwise direction of the wet film 18 is made. Further, in the tenter dryer 45, a drying air is applied to the wet film 18, such that the drying may be made in the predetermined conditions. Note that the inside of the tenter dryer 45 is partitioned into a plurality of temperature zones, in which it is preferable to control the temperature independently. Thus the wet film 18 is dried and fed out as the film 22 from the tenter dryer 45. Then the film 22 is fed to the edge slitting device 46 which is disposed downstream from the tenter dryer 45. In the edge slitting device 46, both side edge portions of the film 22 is slit off. Tips of the slit side edge portions of the film 22 are crushed by a crusher 93 which is connected to the edge slitting device 46.

The drying chamber 47 incorporates many rollers 100. Further to the drying chamber 47 is attached an adsorbing device 101 for adsorbing and recovering the solvent vapor which is generated in the evaporation of the solvent from the film 22. Further, in a downstream from the drying chamber 47, there is the cooling chamber 48 for cooling the film 22. Furthermore, a humidity control chamber (not shown) may be provided for conditioning the humidity between the dying chamber and the cooling chamber 48.

In the downstream side from the drying chamber 47, a compulsory neutralization device (or neutralization bar) 102 eliminates the charged electrostatic potential of the film 22 to the predetermined value (for example, in the range of −3 kV to +3 kV). The position of the neutralization process is not restricted in this embodiment. For example, the position may be a predetermined position in the drying section or in the downstream side from a knurling roller 103, and otherwise, the neutralization may be made at plural positions. After the neutralization, the embossing of both side portions of the film 22 is made by the embossing rollers to provide the knurling. Further, in the winding chamber 49, there are a winding shaft 110 for winding the film 22 and a press roller 111 for controlling the tension of the film in the winding.

<Casting Die>

Figure 4:
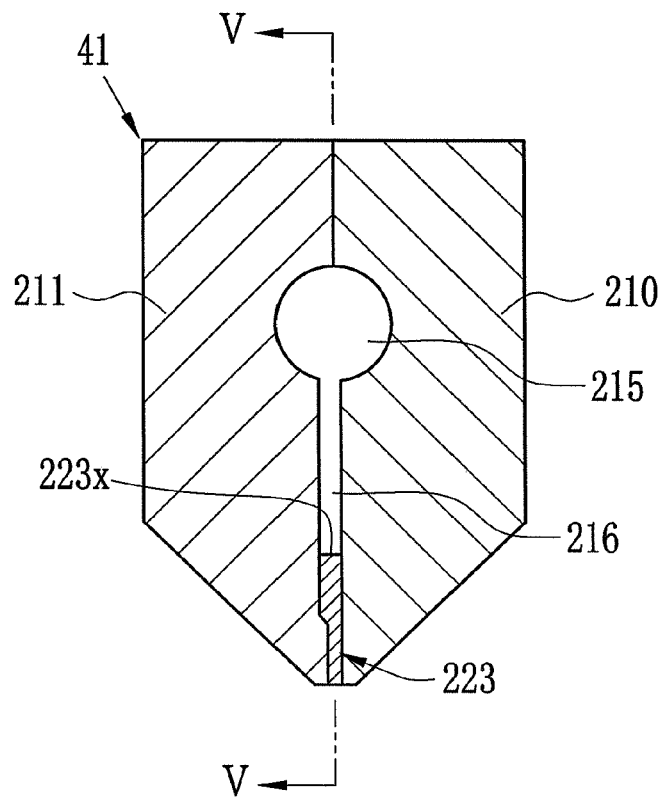
FIG. 4 is a sectional view of the casting die.
Figure 5:
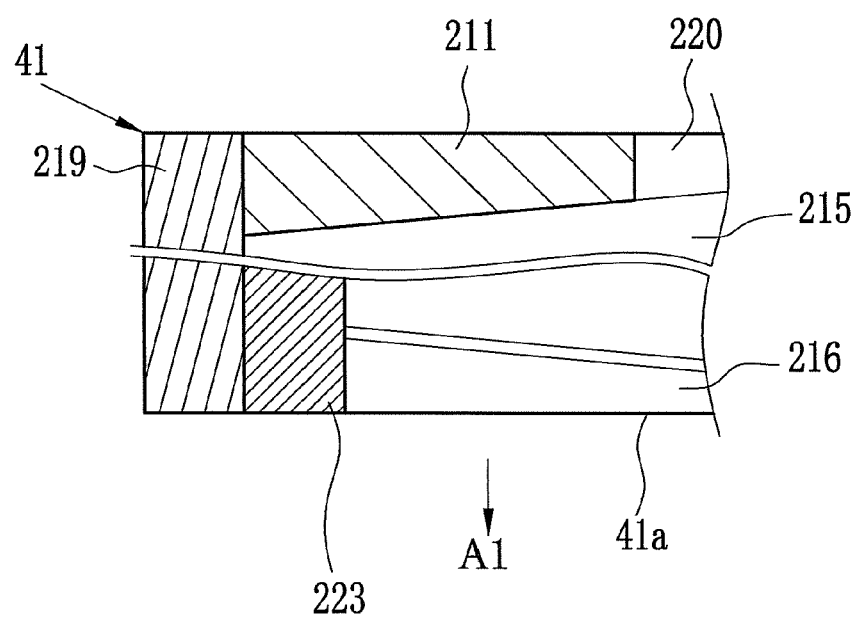
FIG. 5 is a sectional view of the casting die along a line V-V in FIG. 4.

As in FIGS. 4 & 5, the casting die 41 as the casting device has two lip plates 210, 211. Each of the lip plates 210, 211 has a recess of a predetermined shape, and the lip plates 210, 211 are disposed such that the recesses may be combined to form both a manifold 215 whose edge is circularly shaped and a slit 216.

As shown in FIGS. 5 & 6, two side plates 218, 219 are disposed on side edges of the lip plates 210, 211. A packing (not shown) is disposed between the lip plates 210, 211 and the side plates 218, 219, so as to firmly combine and contact the lip plates 210, 211 and the side plates 218, 219. The manifold 215 has a coat hanger shaped form, includes an inlet 220 connected to the pipe 61 (see FIG. 2). In the lower side of the manifold 215, the slit 216 is formed, and inner deckle plates 223, 224 are disposed on both edges of the slit 216 so as to firmly contact to the packing. Note that an upper end 223x (FIG. 4) is positioned in the slit 216. However, the present invention is not restricted in it. The upper end 223x may be positioned on an upper end or a lower end of the manifold. Further, if the lip plates 210, 211 are firmly adhered to the side plates 218, 219 and further if the manifold 215, the slit 216 and the like are closed enough, the packing may not be used.

The lip plates 210, 211 respectively have contact faces 210a, 211a that are to contact to the casting dope 14 and form walls of the slit in a lengthwise direction LD. The inner deckle plates 223, 224 respectively have contact faces 223a, 224a that are to contact to the casting dope 14 and form walls of the slit in a widthwise direction WD. The contact faces 210a, 211a, 223a, 224a form the slit 216 and the outlet 41a, and the end of the slit 216 is the outlet 41a. The casting dope 14 is supplied through the inlet 220 into the manifold 215, flows in the slit 216, and is discharged through the outlet 41a from the casting die 41 into a flow-out direction (discharging direction) A1.

The lip plate 211 and the inner deckle plate 223 respectively are provided on downstream faces in the flow-out direction A1 with an end face 211b and an end face 223b which are the most downstream faces in the passage of the casting dope 14. Further, the contact face 211a and the end face 211b of the lip plate 211 forms a ridge 211c, and the contact face 223a and the end face 223b of the inner deckle plate 223 forms a ridge 223c. Ideally, lower ends of the inner deckle plate 211 are disposed on an ideal face, which means that there are no protrusions of the lower ends on the die lip of the casting die 41. However, it is too difficult to dispose the lip plate 211 and the inner deckle plate 223 in the ideal manner. In the actual die production, the lower end of the inner deckle plate 211 forms a protrusion on the die lip. Thus, in the present invention, the protrusion is reduced to be at most a predetermined value. Concretely, a distance CL1 between the ridge 211c and the ridge 223c is at most 9 μm. In the side of the outlet 41a, the lip plate 210 and the inner deckle plate 224 respectively have an end face 210b and an end face 224b which are the most downstream faces in the passage of the casting dope 14. Further, the contact face 210a and the end face 210b of the lip plate 210 forms a ridge 210c, and the contact face 224a and the end face 224b of the inner deckle plate 224 forms a ridge 224c. It is also too difficult to position the lower ends of the lip plate 210 and the inner deckle plate 223 in the ideal manner. In the actual die production, the lower end of the inner deckle plate 223 forms a protrusion on the die lip. Thus in the present invention, the protrusion is reduced to be at most a predetermined value. Concretely, a distance CL2 between the ridge 210c and the ridge 224c is at most 9 μm. Further, a distance CL3 between the ridge 211c and the 224c and a distance CL4 between the ridge 210c and the ridge 223c are also at most 9 μm.

Note that the flow-out direction A1 can be determined by a method in which a tracer material is injected into the casting dope 14 and the path of the particles of the tracer material is observed. Otherwise, the flow-out direction A1 can be determined by a method of using a photoelastic device in which the flow birefringence phenomena of the polymer solution is observed.

(Material)

The materials to be used for producing the lip plates 210, 211 and the inner deckle plates 223, 224 in the casting die 41 preferably have resistance to the oxidization and the corrosion which the contact to the casting dope 14 causes. Further, in order to keep the distances CL1-CL4 in the predetermined range, it is preferable that the size variation hardly occurs in the casting process. Thus the materials for the lip plates 210, 211 and the inner deckle plates 223, 224 preferably have the following characteristics:

(1) the corrosion resistance is the same as SUS316 in the compulsory corrosion experiment in an electrolyte water solution, (2) the pitting (or pitting corrosion) does not occur on the gas-liquid interface even if this material were dipped in a mixture liquid of dichloromethane, methanol and water for three months, and (3) the coefficient of thermal expansion is at most $2 \times 10^{-5}$ ($°C.^{-1}$).

Figure 7A:
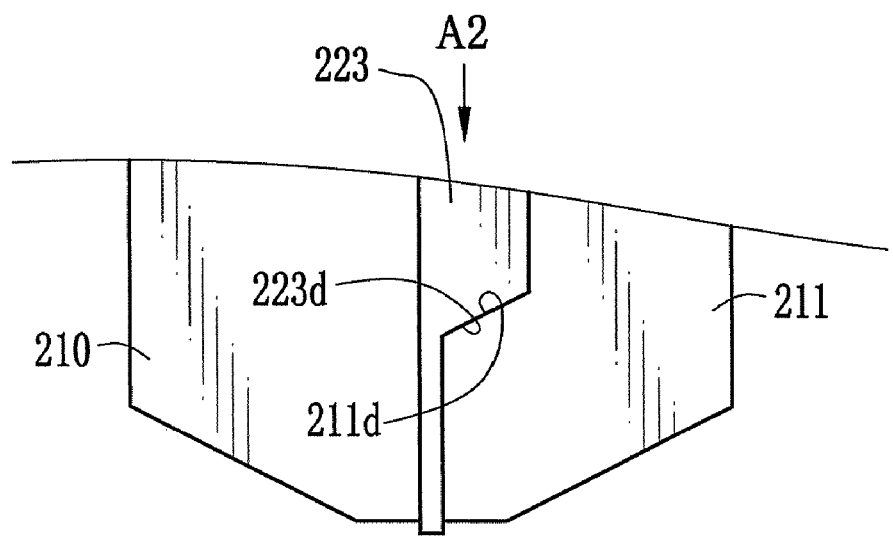
FIG. 7A-7B are side views of the casting die, illustrating situations of adjusting positions of inner deckle plates of the casting die.
Figure 7B:
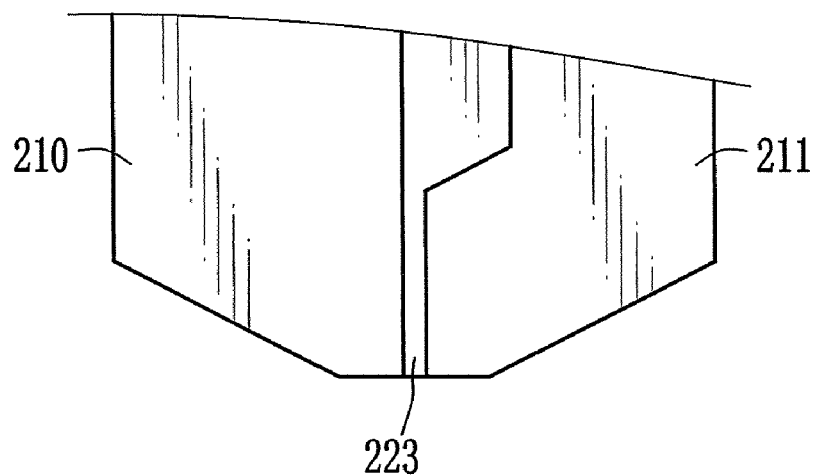

Therefore, the materials for the lip plates 210, 211 and the inner deckle plates 223, 224 are preferably a stainless and a ceramics, and particularly austenite type stainless, especially SUS 316, SUS 316L. Further, a precipitation hardened stainless is also especially preferable, such as SUS 630, SUS 631 and the like. An example of an adjusting method of the distances CL1-CL4 will be described now. Note that the adjusting method is not restricted in the following description. At first, the lip plates 210, 211 and the inner deckle plates 223, 224 are obtained to have the predetermined sizes. Secondary, as shown in FIG. 7A, the lip plates 210, 211 and the inner deckle plates 223, 224 are combined. Thirdly, the distances CL1-CL4 are measured just after the combination of the lip plates 210, 211 and the inner deckle plates 223, 224. At the measurement, a force is applied in a direction A2 to the inner deckle plate 223, such that a face 223d of the inner deckle plate 223 and a face 221d of the lip plate 221 may contact to each other. According to the inner deckle plate 224 which is not shown in FIG. 7A, the measurement of the distances CL1-CL4 is made in the same manner. Fourthly, the inner deckle plates 223, 224 are removed, and the processing of the faces 223b, 224b is made such that the distances CL1-CL4 may be at most 9 μm. Thus distances CL1-CL4 are adjusted so as to have the predetermined value.

If the above adjusting method is made, it is preferable to further satisfy not only the above conditions (1)-(3) but also the following conditions:

(4) the rate of the volume fluctuation of the lip plates 210, 211 and the inner deckle plates 223, 224 just after the processing is at most 0.05%, and (5) the inner deckle plates 223, 224 is not so hard as to damage the lip plates 210, 211.

It is preferable in the present invention, the rate of volume fluctuation of the lip plates 210, 211 and the inner deckle plates 223, 224 satisfies the above condition (4). The rate of volume fluctuation means a maximum of the rates of the size fluctuation $a_x$, $a_y$, $a_z$, in the x, y, z Cartesian coordinate system. The rate of the size fluctuation $a_x$ is defined to $\Delta b_x/b_x$, in the case that the size fluctuation of the inner deckle plate 223, 224 is $\Delta b_x$ on the application of the outer force F (about 90 N) per unit size (1 mm$^2$) in the x-axis direction and the size of the inner deckle plate before the application of the outer force is $b_x$. The rate of the size fluctuation $a_y$ is defined to $\Delta b_y/b_y$, if the size fluctuation of the inner deckle plate 223, 224 is $\Delta b_y$ on the application of the outer force F in the y-axis direction and the size of the inner deckle plate before the application of the outer force is $b_y$. The rate of the size fluctuation $a_z$ is defined to $\Delta b_z/b_z$, in the case that the size fluctuation of the inner deckle plate 223, 224 is $\Delta b_z$ on the application of the outer force F in the z-axis direction and the size of the inner deckle plate before the application of the outer force is $b_z$.

According to the condition (5), for example, if the precipitation hardened stainless is used as the material for the lip plates 210, 211, it is preferable that the materials for the inner deckle plate 223, 224 has the Vickers hardness in the range of 200 Hv to 1000 Hv. Therefore, the stainless or the ceramics are preferably used as the materials for the inner deckle plate 223, 224. Further, the material for the inner deckle plate preferably has magnetism. In this case, when the processing of the face 223b, 224b is made, the inner deckle plate 224, 224 is fixed by the magnet, and therefore the processing accuracy of the distances CL1-CL4 become higher.

According to the contact faces 210a, 211a, 223a, 224a of the lip plates 210, 211 and the inner deckle plates 223, 224, it is preferable that the finish accuracy is at most 1 μm in surface roughness and the straightness is at most 1 μm/m in any direction. When the finish accuracies of the contact faces 210a, 211a, 223a, 224a satisfy the above condition, the formation of the streak and the unevenness on the casting film is prevented. The smoothness of the faces 210b, 211b, 223b, 224b is preferably at most 2 μm.

Preferably, a hardened layer is preferably formed on the faces 210b, 211b, 223b, 224b. A method of forming the hardened layer is not restricted. But it is, for example, ceramics hard coating, hard chrome plating, neutralization processing, and the like. If ceramics is used as the hardened layer, it is preferable that the used ceramics is grindable but not friable, with a lower porosity, high resistance of corrosion, and no adhesiveness to the casting die 41. Concretely, there are tungsten carbide (WC), $Al_2O_3$, TiN, $Cr_2O_3$, and the like. Especially preferable ceramics is tungsten carbide. Tungsten carbide coating can be made by a spraying method.

A width of the casting die 41 is not restricted especially. However, the width is preferably at least 1.1 times and at most 2.0 times as large as a film width. Further, it is preferable to attach a temperature controlling device (not shown) to the casting die 41, such that the temperature may be kept to the predetermined one during the film production. Furthermore, the casting die 41 is preferably a coat hanger type die.

In order to adjust a film thickness, the casting die 41 is preferably provided with an automatic thickness adjusting device. For example, thickness adjusting bolts (heat bolts) are disposed at a predetermined distance in a widthwise direction of the casting die 41. According to the heat bolts, it is preferable that the profile is set on the basis of a predetermined program, depending on feed rate of the pumps (preferably, high accuracy gear pumps) 58, while the film production is performed. Further, the feed back control of the adjustment value of the heat bolts may be made by the adjusting program on the base of the profile of a thickness meter (not shown), such as infrared ray thickness meter and the like. The thickness difference between any two points in the widthwise direction except the side edge portions in the casting film is controlled preferably to at most 1 μm. The difference between the maximum and the minimum of the thickness in the widthwise direction is at most 3 μm, and especially at most 2 μm. Further, the accuracy to the designated object value of the thickness is preferably in ±1.5 μm. Further, it is preferable to control the shearing rate of the casting dope 14 in the range of one (1/sec) to 5000 (1/sec).

An embodiment of the film production method for producing the film 22 with use of the film production line 40 will be described now. The dope 11 is always made uniform by the rotation of the stirrer 56. The additives such as the plasticizer and the like may be added during the stirring.

The pump 58 is driven to feed the dope 11 to the filtration device 59, in which the filtration of the dope 11 is made. The matting agent liquid and the UV absorbing agent liquid are mixed in a pipe (not shown), and the mixing thereof is made by a static mixer (not shown) to be a uniform additive liquid. Then the additive liquid is added to the dope 11 fed in the pipe 61 (see, FIG. 1). Thereafter, the mixing of the dope 11 with the additive liquid is made by the static mixer 60, and the dope 11 becomes uniform and is fed out as the casting dope 14 from the static mixer 60. The mixing ratio between the dope 11, the matting agent liquid and the UV absorbing agent is not restricted especially. However, it is preferable that the ratio of the weight percentages (the dope 11, the matting agent liquid and the UV absorbing agent) is from (90 wt. %; 5 wt %; 5 wt. %) to (99 wt. %; 0.5 wt. %; 0.5 wt. %).

The drive of the back-up rollers 42, 43 is preferably controlled such that a tension of the casting belt 44 may be in the range of $10^4$ N/m to $10^5$ N/m. Thereafter, the casting dope 14 is cast from the casting die 41 onto the casting belt 44. The relative speed difference between the casting belt 44 and each back-up roller 42, 43 is at most 0.01 m/min. According to the control of the casting belt 44, preferably, the change of the running speed is at most 0.5% from the predetermined value, and the meandering in the widthwise direction in one cycle running is at most 1.5 mm. In order to reduce the meandering, a detector (not shown) is preferably provided above each edge portion of the casting belt 44, so as to make a feed-back control of the position of the casting belt 44 on the basis of measured values. Furthermore, the position of the casting belt 44 shifts up- and downwardly in accordance with the rotation of the back-up roller 42. Therefore, it is preferable that the position of the casting belt 44 is preferably controlled just below the casting die 41, such that a shift range of the casting belt 44 may be at most 200 μm. The inner temperature of the casting chamber 81 is preferably controlled in the range of −10° C. to 57° C. by the temperature controlling device 65. The solvent vapor in the casting chamber 81 is condensed by the condenser 82, and the recovered solvent was recovered by the recovering device 67 and then recycled as a solvent for the dope preparation.

The casting dope 14 is discharged through the outlet 41a of the casting die 41. Between the casting die 41 and the casting belt 44, a bead of the discharged dope forms a bead, and the cast dope forms the casting film 16 on the casting belt 44. Preferably, the temperature of the casting dope 14 is in the range of −10° C. to 57° C. Further, in order to stabilize the formation of a bead of the cast dope, there is the decompression chamber 85 for controlling the pressure in the back side of the dope bead. The decompression is preferably made such that the pressure difference of an upstream to a downstream side from the dope bead may be in the range of −10 Pa to −2000 Pa.

It is preferable to provide the decompression chamber 85 with a jacket (not shown) for controlling the inner temperature. The temperature of the decompression chamber 85 is not restricted especially. However, the temperature is preferably at least the highest melting point of the used organic solvent materials. Further, aspirators (not shown) maybe provided with the decompression chamber 85 so as to be near both side edges of a dope outlet of the casting die 41. Thus the aspiration in both side edges of the dope bead is made to stabilize the shape of the dope bead. In this case, the force velocity of the aspiration is preferably in the range of one to one hundred liter/min.

The air blowers 87a-87c feed a wind such that the solvent in the casting film 16 may evaporate more. In this case, although the application of the drying air cause to change surface conditions of the casting film 16 just after the formation, a air shielding device 87d reduces the change of the surface conditions. The surface temperature of the casting belt 44 is preferably in the range of −20° C. to 40° C.

When the cast dope has self-supporting property, the casting film 16 is peeled as the wet film 18 with support of the roller 89. The content of the remaining solvent at the peeling is preferably in the range of 20 wt. % to 250 wt. % to the content of the solid materials. Then the wet film 18 is transported in the transfer area 90 in which many rollers are provided. In the transfer area 90, the air blower 91 feeds a drying air whose temperature is a predetermined value. Thus the drying of the wet film 18 proceeds. In the transfer area 90, the rotation speed of each roller becomes higher in the upstream side. Thus the draw tension can be applied to the wet film 18 in the transporting direction.

In the tenter dryer 45, the wet film 18 is held by clipping both side edge portions with use of the clips and the like. While the clips move to transport the wet film 18, the drying is made in the predetermined conditions.

The wet film 18 is dried until the content of the remaining solvent become the predetermined value, and fed out as film 22 from the tenter dryer 45 toward the edge slitting device 46 for slitting off both side edge portions. The slit side edge portions are sent to the crusher 93 by a cutter blower (not shown), and crushed to tips by the crusher 93. The tips are reused for preparing the dope, which is effective in view of the decrease of the production cost. Note that the slitting process of both side edge portions may be omitted. However, it is preferable to perform the slitting between the casting process and the winding process.

The film 22 whose side edge portions are slit off is sent to the drying chamber 47 and dried furthermore. In the drying chamber 47, the film 22 is transported with lapping on rollers 100. The inner temperature of the drying chamber 47 is not restricted especially. However, it is preferable in the range of 50° C. to 160° C. The solvent vapor evaporated from the film 22 by the drying chamber 47 is adsorbed by the adsorbing device 101. The air from which the solvent components are removed is reused for the drying air in the drying chamber 47. Note that the drying chamber 47 preferably has plural partitions for variation of the drying temperature. Further, a pre-drying device (not shown) is provided between the edge slitting device 46 and the drying chamber 47, so as to perform the pre-drying of the film 22. Thus it is prevented that the temperature of the film 22 increases rapidly, and therefore the change of the shape of the film 22 is reduced.

The film 22 is transported toward the cooling chamber 48, and cooled therein to around the room temperature. A humidity control chamber (not shown) may be provided for conditioning the humidity between the drying chamber 47 and the cooling chamber 48. Preferably, in the humidity control chamber, an air whose temperature and humidity are controlled is applied to the film 22. Thus the curling of the film 22 and the winding defect in the winding process can be reduced.

Thereafter, the compulsory neutralization device (or neutralization bar) 102 eliminates the charged electrostatic potential of the film 22 to the predetermined value (for example, in the range of −3 kV to +3 kV). The position of the neutralization process is not restricted in this embodiment. For example, the position may be a predetermined position in the drying section or in the downstream side from the knurling roller 103, and otherwise, the neutralization may be made at plural positions. After the neutralization, the embossing of both side portions of the film 22 is made by the embossing rollers to provide the knurling. The emboss height from the bottom to the top of the embossment is in the range of 1 μm to 200 μm.

In the last process, the film 22 is wound by the winding shaft 110 in the winding chamber 49. At this moment, a tension is applied at the predetermined value to a press roller 111. Preferably, the tension is gradually changed from the start to the end of the winding. In the present invention, the length of the film 22 is preferably at least 100 m. The width of the film is preferably at least 600 mm, and particularly in the range of 1400 mm to 2500 mm. Further, even if the width is more than 2500 mm, the present invention is effective. Even if the thickness is in the range of 20 μm to 80 μm, the present invention can be applied.

The detailed explanation about the discharging of the casting dope 14 through the outlet 41a of the casting die 41 will be made, now.

Figure 3:
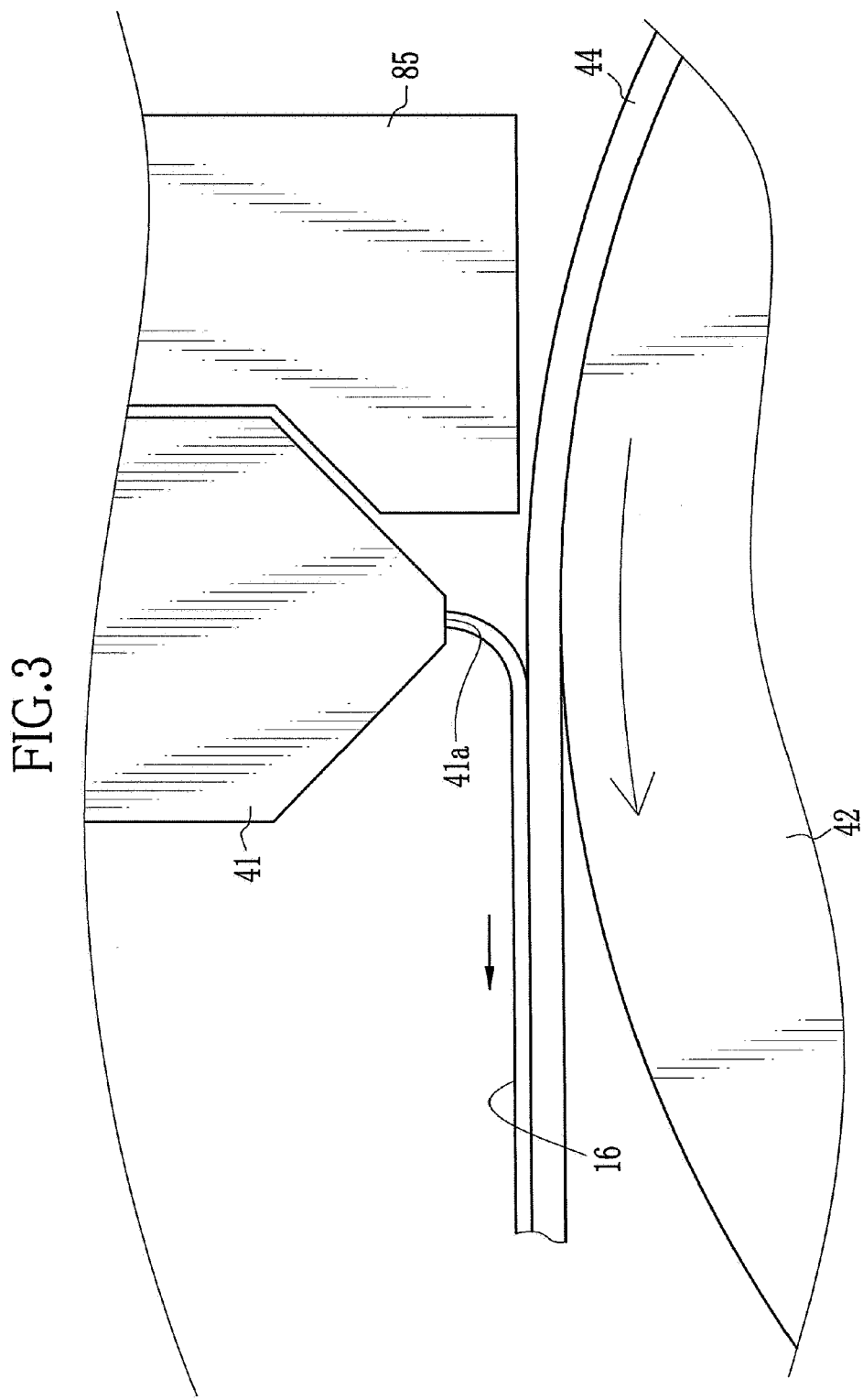
FIG. 3 is a schematic diagram illustrating a situation of the discharge of a casting dope from a casting die of a first embodiment of the present invention in the film production line.

As shown in FIGS. 3 & 6, in the casting process 17 (see, FIG. 1), the dope 14 flows through the inlet 220, the manifold 215 and the slit 216. In the slit 216, the casting dope 14 flows toward the outlet 41a, while the width of the casting dope 14 is regulated by the contact faces 223a, 224a, and the thickness of the casting dope 14 is regulated by the contact face 210a, 211a. The casting dope 14 is discharged in the flow-out direction A1 through the outlet 41a of the casting die 41. The distances CL1-CL4 among the ridge 210c, 211c, 223c, 224c in the flow-out direction A1 are at most 9 μm, and therefore the casting dope 14 discharged through the outlet 41a flows out from the casting die 41 onto the casting belt 44 without the retaining. Thus the casting dope 14 forms the casting film 16 on the casting belt 44 without forming the skinning on the outlet 41a of the casting die 41.

The causes of the generation of skinning of the casting dope 14 are not known in detail. However, if the distances CL1-CL4 are large, the followings will be considerable according to the effects of the present invention. When the casting dope 14 of the viscoelastic fluid is discharged through the outlet 41a, the die-swell phenomena occurs. The reason of the occurrence of the die-swell phenomena is believed as that the elastic shear strain which usually occurs in the viscoelastic flow through the pipe is recovered near an outlet of the pipe. Thus, in the casting die 41, the recovering of the elastic shear strain near the outlet 41a causes the retaining of the casting dope 14. Generally, in the casting die constructed of a pair of the lip plates or a pair of the inner deckle plates, the distances CL1-CL4 are not zero. Therefore, in the lower end of the die lip, the casting dope fed out from the outlet 41a in the flow-out direction A1 contact to only one of the contact faces, while being already apart from the contact face of the opposite side. In this situation, part of the casting dope is contacting to the contact face, and the elastic shear strain of the part is recovered in effect of the die-swell phenomena. Thus the swelling of the casting dope occurs. Further, another part of the casting dope is apart from the contact face of the opposite side, namely is not contacting to the contact face of the opposite side, the elastic shear strain is not recovered. Thus, if the partial occurrence of the recovering of the elastic shear strain continues for a while, the disorder of the flow of the casting dope occurs entirely, so as to cause the retaining of the casting dope contacting to the casting face. Further, the disorder of the casting dope becomes larger depending on the enlargement of the distances CL1-CL4. In the present invention, however, since the distances CL1-CL4 are at most 9 μm, the retaining of the casting dope that is caused by the die-swell phenomena is prevented. Therefore, in the present invention, the flow disorder or the elastic shear strain of the casting dope 14 flowing through the passage in the casting die 41 is reduced. Consequently, the adhesion and the retaining of the casing dope to the lip plates 210, 211 are prevented, while the adhesion and the retaining usually causes the skinning.

In the present invention, the discharging speed of discharging the casting dope 14 through the outlet 41a depend on neither the form of the outlet 41a nor the viscoelasticity of the casting dope 14 to be used for the film production, and in any case, the effect of reducing the skinning can be expected. Therefore, the present invention can be widely applied to the solution casting method for producing the several sorts of the film.

As for the solution casting method, the solution casting apparatus and the casting die 41 of the present invention, the casting process 17 is performed while the retaining of the casting dope 1, which causes the skinning, is reduced. Therefore, the cleansing of the support and the removing the skinning are not necessary during the film production. Thus the film production can be made efficiently. In consideration with the increase of the production speed of the solution casting method, the speed of the casting process is one of the large elements thereof. In order to increase the production speed, not only the running speed of the casting belt 44 but also the increase of the decompression by the decompression chamber 85 is indispensable. In the present invention, however, the occurrence of the skinning is prevented also at the high film production speed, and the casting process 17 is made stably. Further, in the prior art, it is considered that the retaining of the casting dope 14 easily occurs in the rectangle outlet. However, in the present invention, the effect is achieved, also even if the outlet of the casting device has any shape. Therefore, it is possible to apply the present invention to the casting device having the outlet of rectangle shape. Furthermore, the skinning and the retaining cause several elements which are to have bad influences on the solution casting method, are prevented. However, in the present invention, the elements are also prevented. As the elements, for example, there is a die line which is formed by the occurrence of solidified particles of the dope in the inner side on the contact faces 210a, 211a, 223a, 224a near the die lips.

Further, the casting device of the present invention is used not only in the casting die, the solution casting line and the solution casting method, but also in the discharging processing of the viscoelastic fluid. In this case, the bad elements (for example, the die line and the like) caused by the retaining and the die swell phenomena can be prevented.

In the above embodiment, the faces 210b, 211b, 223b, 224b of the lip plates 210, 211 and the inner deckle plates 223, 224 are in parallel, and the explanation is made under this condition. However, in consideration of the actual processing of the faces, it is rear that the faces 210b, 211b, 223b, 224b of the lip plates 210, 211 and the inner deckle plates 223, 224 are in parallel. However, the present invention can be applied even if the faces 210b, 211b, 223b, 224b of the lip plates 210, 211 and the inner deckle plates 223, 224 are not in parallel. In this case, when a first ridge formed by the side face and the contact face of one of the members constructing the outlet 41a and a second ridge of another member are considered, the difference between the first and second ridges in the flow-out direction A1 is at most 9 μm. Thus the effect of the present invention is achieved. Therefore, when the inner deckle plate 223, 224 are protrudes from the side plates 210, 211 in the flow-out direction A1, otherwise when the side plates 210, 211 are protrudes from the inner deckle plate 223, 224 in the flow-out direction A1, the effect of the present invention is achieved under the condition that the protrusion length is at most 9 μm. Note that the condition of at most 9 μm is also satisfied if any protrusion cannot be found on the die lip. Therefore, also in this case, the effect of the present invention is achieved.

By the way, according to the side plates 210, 211 and the inner deckle plates 223, 224 in the lip end, any one of edges of the contact face sometimes curves in an in-plane direction of the contact face to form a jaggy (or zigzag) curve line. Therefore, in order to prevent the continuous occurrence of the partial recovering of the elastic shear strain, it is preferable in the present invention to regulate a curve difference of each edge in a downstream end of the contact faces 210a, 211a, 223a, 224a, while the curve difference is defined as a maximum between a top and a bottom of the jaggy curve. It means that the present invention is more effectively performed if not only the protrusion length between the different ridges perpendicular to the flow-out direction but also the curve difference of each edge in the lower end portion of the member constructing the passage of the dope are regulated. Concretely, the curve difference is preferably at most 9 μm. For example, in this embodiment, the inner deckle plates 223, 224 are protrudes from the side plates 210, 211 in the flow-out direction on the downstream end of the slit 216, and the edges in the downstream end of the contact faces 210a, 211a, 223a, 224a are not only the ridges 210c, 211c, 223c, 224c which are perpendicular to the flow-out direction, but also ridges 223x 223y, 224x, 224y which are extending in the flow-out direction. The ridge 223x is an edge of the contact face 223a that connects the ridges 210c, 223c, the ridge 223y an edge of the contact face 223a that connects the ridges 211c, 223c, the ridge 224x an edge of the contact face 224a that connects the ridges 210c, 224c, and the ridge 224y an edge of the contact face 224a that connects the ridges 211c, 224c. The curve difference of each ridge 210c, 211c, 223c, 224c, 223x 223y, 224x, 224y is preferably at most 9 μm.

The regulation of the curve difference is made in the same manner even if the side plates 210, 211 protrudes from the inner deckle plates 223, 224 in the flow-out direction A1. In this case, the edges on the downstream end of the contact faces 210a, 211a, 223a, 224a are not only the ridges 210c, 211c, 223c, 224c, but also the face edges (not shown) of the downstream end of the contact faces 210a, 211a in the downstream side from the ridges 223c, 224c.

Furthermore, it is preferable in the present invention that the edges of the downstream end of the contact faces 210a, 211a, 223a, 224a may be curved to have an arc shape.

Since the dope to be used for the solution casting method is viscoelastic fluid, both side edges of the bead of the discharged casting die between the outlet and the support becomes thicker in effect of the neck-in phenomena. (hereinafter, the defect of called the edge defect). Even if the edge defect of the bead occurs in the film production, the both side edge portions of the produced film cannot be used as the film product, and therefore the production efficiency of the film becomes lower. Further, in the film production process, the casting film having the thick side edge portions causes the lower adhesiveness to the support. Thus the self supporting property of the casting film on the support cannot be enough, or the film twines around the rollers.

The neck-in phenomena causing the edge defect occurs more extremely, in the case that the viscosity of the dope becomes higher, and in the case that the air gap from the outlet to the support becomes larger. In order to make the viscosity of the dope, it is necessary to change the polymer composition or to use the dope of lower polymer concentration. Changing the polymer composition is not preferable because of the restriction to the optical properties of the film to be produced. Further, using the dope of the lower polymer concentration causes the lower productivity, since the occurrence of the self supporting properties becomes harder.

Therefore, in order to prevent the defects caused by the neck-in phenomena of the casting dope 14, the air gap AG (see, FIG. 3) is preferably at most 100 mm, particularly at most 10 mm, and especially at most 5 mm. The air gap AG is the smallest distance between the surface of the support (the casting belt 44 and the like) and one of the ridges 210*c*, 211*c*, 223*c*, 224*c*. In order to prevent the defect of the casting belt 44 that is caused by the contacting of the casting belt 44 to the inner deckle plates 223, 224 formed of a hard material, the air gap AG is preferably at least 0.1 mm The air gap AG may be controlled depending on the position of the casting die 41, the largeness of the distances CL1-CL4, and the positional fluctuation in the up- and downward directions of the running casting belt 44.

Further, in order to make the air gap AG smaller, it is preferable to form the contact faces 210*a*, 211*a*, 223*a*, 224*a* such that the ridges 223*c*, 224*c* may be closer to the casting belt 44 than the ridges 210*c*, 211*c*. In order to prevent only the occurrence of the skinning, the contact faces 210*a*, 211*a*, 223*a*, 224*a* may be formed such that the ridges 210*c*, 211*c* may be closer to the casting belt 44 than the ridges 223*c*, 224*c*.

In order to make the air gap AG smaller, it is necessary to prevent the defeat of the casting belt 44 by contacting with the inner deckle plates 223, 224 at adjusting the air gap AG and casting the casting dope 14. In the conventional manner, the inner deckle plates are therefore produced from resins, such as Teflon (registered trademark) and the like. In the present invention, however, the inner deckle plates are formed of the hard material such as stainless, ceramics and the like, and thus the regulation of the distances CL1, CL4 and the regulation of the air gap AG can be made in high accuracy. Therefore, in the present invention, the defects caused by the neck-in phenomena are prevented while the skinning is prevented.

In order to prevent the defects caused by the die-swell phenomena and the neck-in phenomena, the viscosity of the casting dope 14 discharged from the outlet 41*a* of the casting die 41 is preferably in the range of 10 Pa·s to 200 Pa·s.

In this embodiment of the casting die, the inner deckle plates 223, 224 are disposed such that the distance between the contact faces 223*a* and 224*a* may be almost constant. However, the present invention is not restricted in this embodiment. In followings, explanation of second-fourth embodiments of the casting die will be made. Note that the same numbers are applied to the same member and parts as the casting die 41, and the explanations thereof will be omitted.

Figure 8:
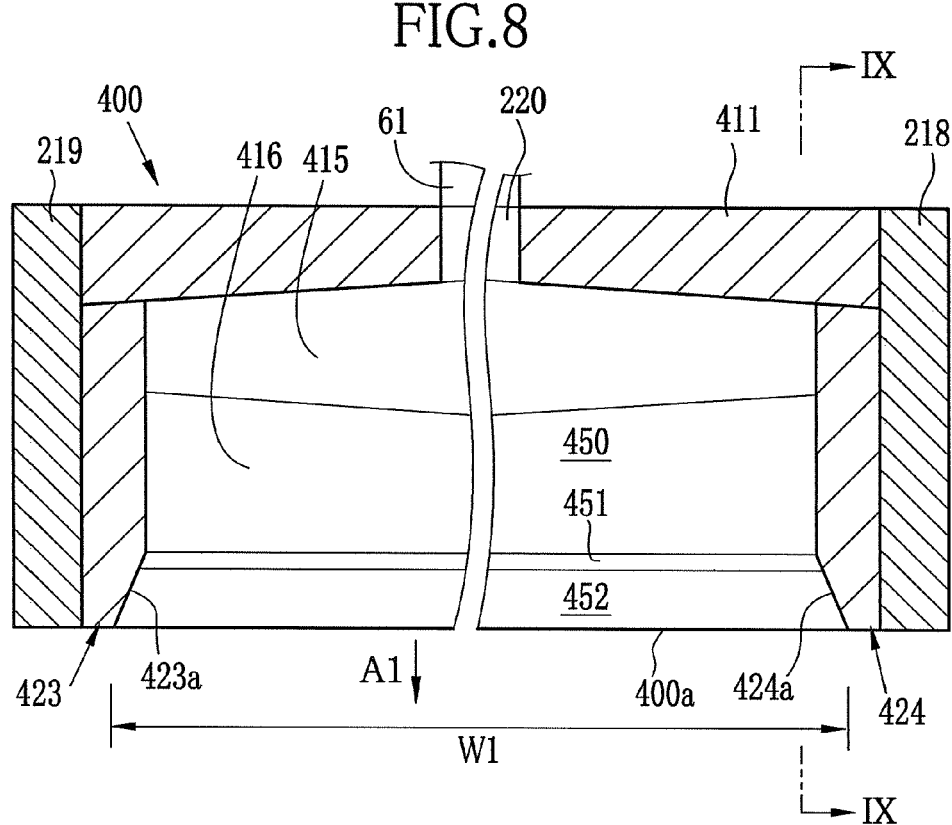
FIG. 8 is a sectional view of a casting die of a second embodiment.
Figure 9:
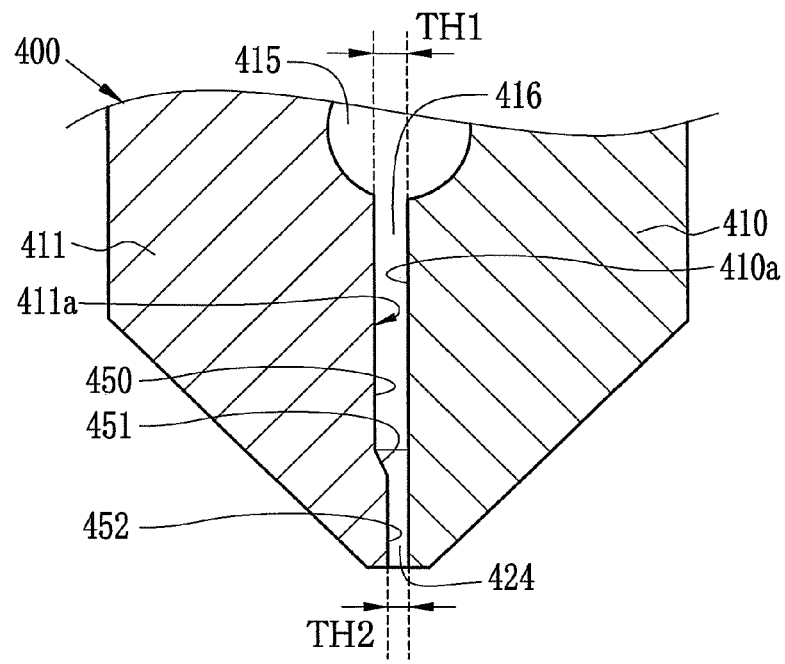
FIG. 9 is a sectional view of the casting die along a line IX-IX in FIG. 8.

As shown in FIGS. 8 & 9, a casting die 400 has an inlet 220 connected to the pipe 61 through which the casting dope flows, and an exit 400*a* for discharging the casting dope which is fed through the inlet 220 into the casting die 400. Further, in the casting die 400, there are a pair of lip plates 410, 411, and a pair of plates 218, 219. There are inner deckle plates 423, 424 between the side plates 218, 219. Further, a packing (not shown) is disposed between the side plate 218 and the inner deckle plate 423, and another packing (not shown) is disposed between the side plate 219 and the inner deckle plate 424. Contact faces 410*a*, 411*a* are respectively formed on the lip plates 410, 411, and contact faces 423*a*, 424*a* are respectively formed on the inner deckle plates 423, 424. The contact faces 410*a*, 411*a*, 423*a*, 424*a* form both of a manifold 415 connecting to the inlet 220 and a slit 416 connecting to the manifold and the outlet 400*a*.

The contact face 411*a* has an upper part 450, a middle part 451 disposed in the downstream side of the upper part 450 in the flow-out direction A1, and a lower part 452 disposed from an lower end of the middle part 451 to the outlet 400*a*. The distance between the upper part 450 and the contact face 410*a* is described as TH1, and the distance between the lower part 452 and the contact face 410*a* is described as TH2. The upper part 450 and the lower part 452 are formed such that a condition TH1>TH2 maybe satisfied. Further, a distance of the middle part 451 to the contact face 410 becomes narrower from the up- to the downstream side in the flow-out direction. Thus in the slit 416, the thickness of the casting dope is controlled at first to the value of TH1 by the upper part 450 to the contact face 410*a*, and then to the value of TH2 by the lower part 452 to the contact face 410*a*. Thereafter, the casting dope is discharged from the outlet 400*a*.

A distance W1 between the contact faces 423*a* and 424*a* is defined as a flow width of the casting dope. The distance W1 is almost constant entirely in the manifold 415, and becomes larger at a predetermined rate in a lower part of the slit 416 near the outlet 400*a*. Thus, the contact faces 423*a*, 424*a* of the inner deckle plates 423, 424 have in the lower end portion an inclination face inclined to an outside in a widthwise direction of the casting die 400. Since each contact faces 423*a*, 424*a* are provided with the inclination face, the both side edge portions of the bead of the discharged casting dope becomes thinner, and therefore the edge defect is prevented. Note that the inclination surface is corresponding to a widening surface of the present invention.

In this embodiment, if a widening start position is determined a position at which the distance W1 between the contact faces 423*a* and 424*a* begins becoming larger, the middle part 451 of the contact face 411*a* becomes wider in a downstream side from the widening start position. However, the present invention is not restricted in the embodiment. The middle part may be formed so as to start extending in the widthwise direction at an upstream position from the extending start position.

Figure 10:
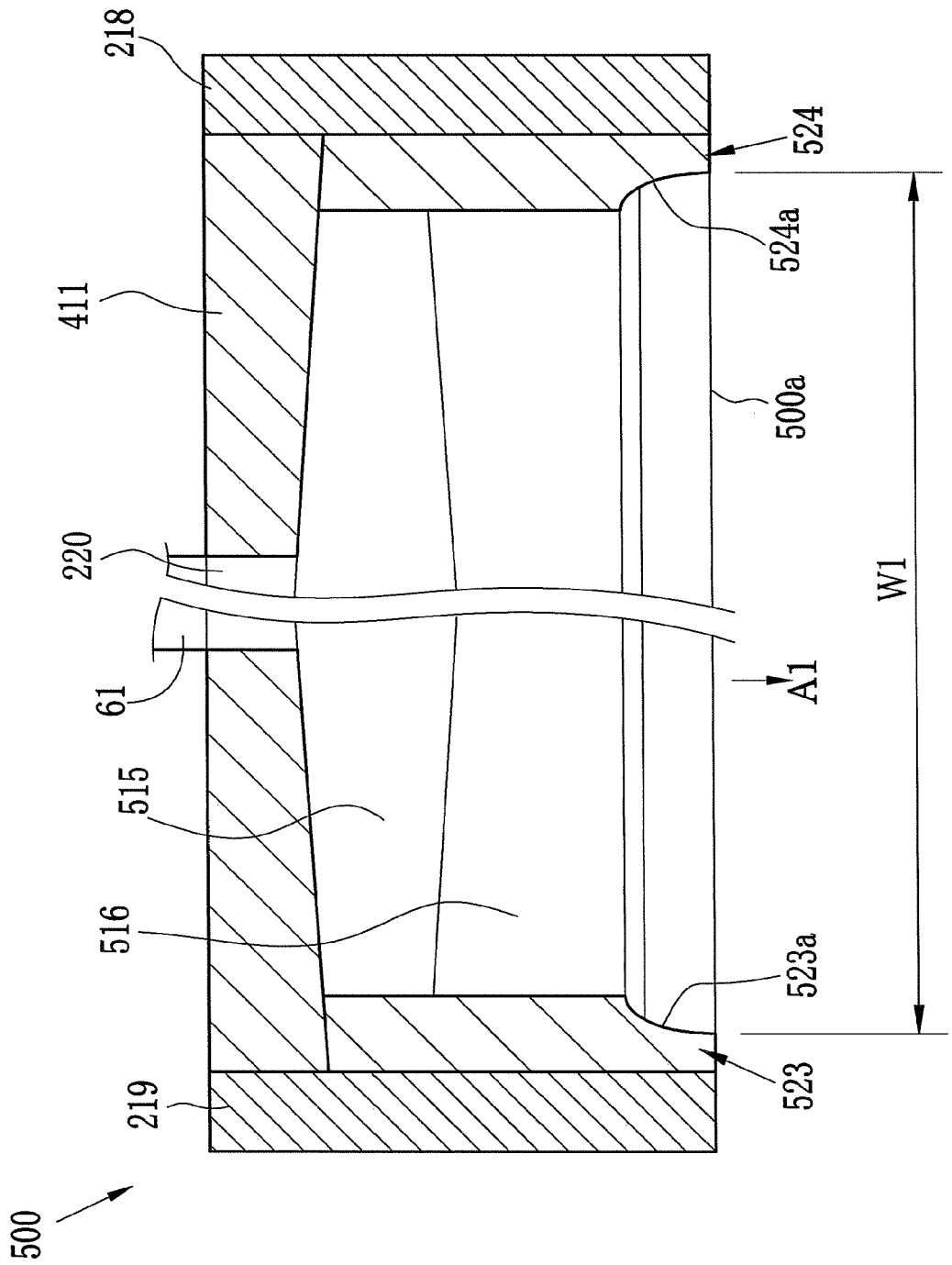
FIG. 10 is a sectional view of a casting die of a third embodiment.

Instead of the casting die 400 of the second embodiment, a casting die 500 of the third embodiment may be used in the present invention, as shown in FIG. 10. The casting die 500 has a manifold 515, a slit 516, contact faces 523*a*, 524*a*, and an outlet 500*a*. The distance W1 between the contact faces 523*a*, 524*a* becomes larger in the closer position to the outlet 500*a*. The lower end portion of the contact faces may be a curving face curving to the outside of the widthwise direction of the casting die. Further, the extending rate of the distance W1 becomes smaller in a lower part of the slit 516 near the outlet 500*a*.

Figure 11:
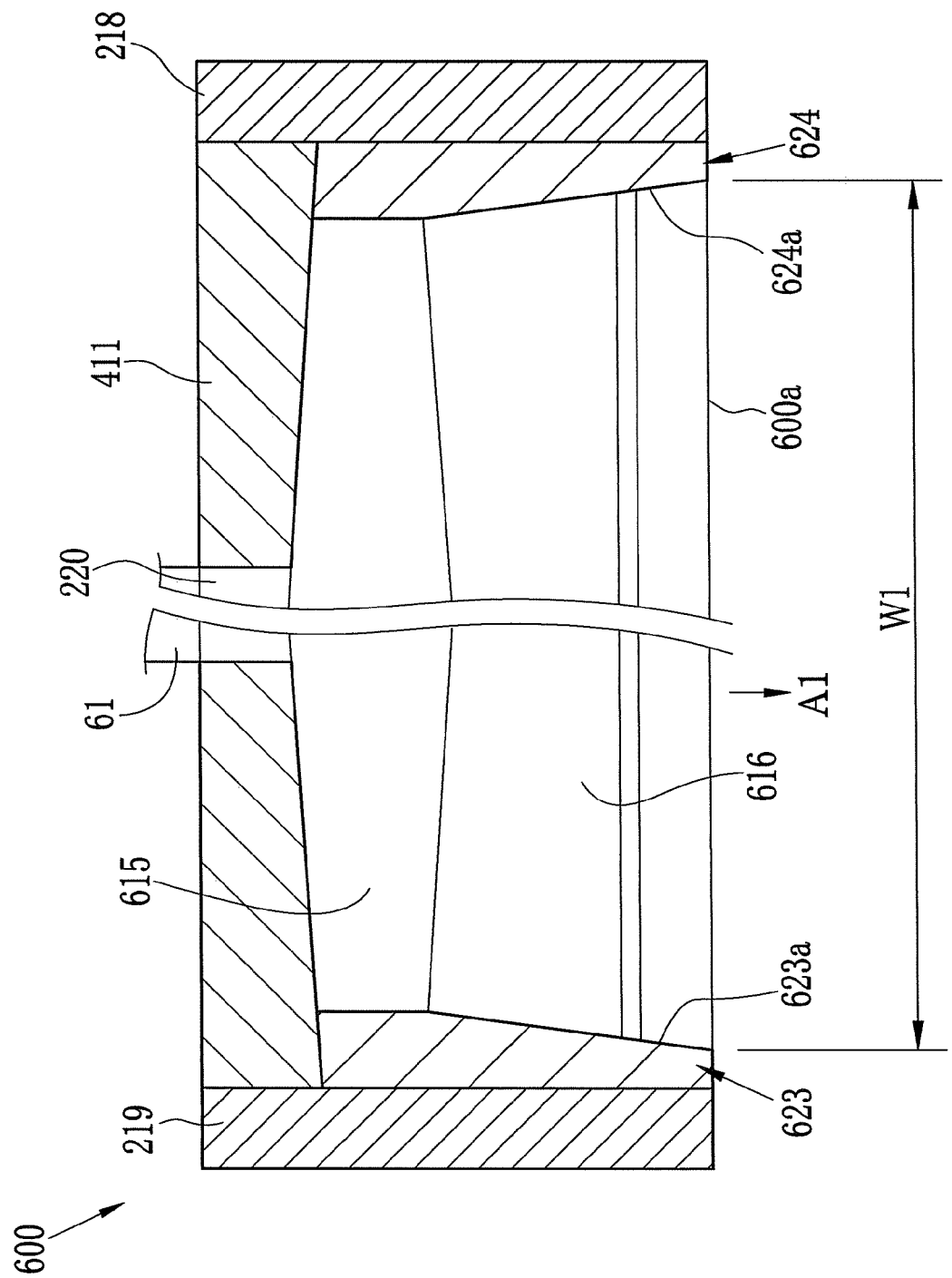
FIG. 11 is a sectional view of a casting die of a fourth embodiment.
Figure 12:
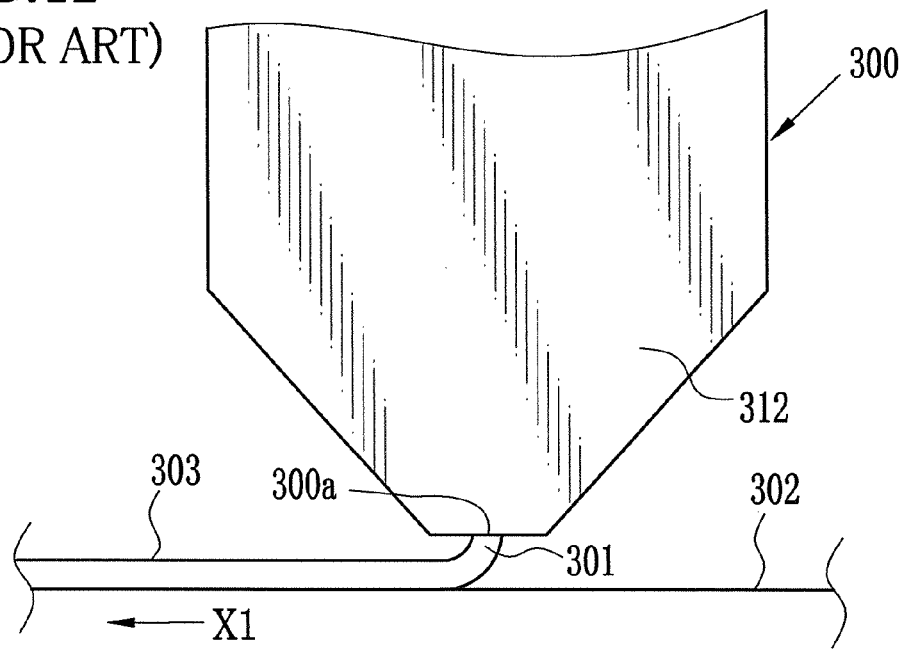
FIG. 12 is a schematic diagram illustrating a situation of the discharge of a casting dope from a casting die in the film production line of a prior art.
Figure 13:
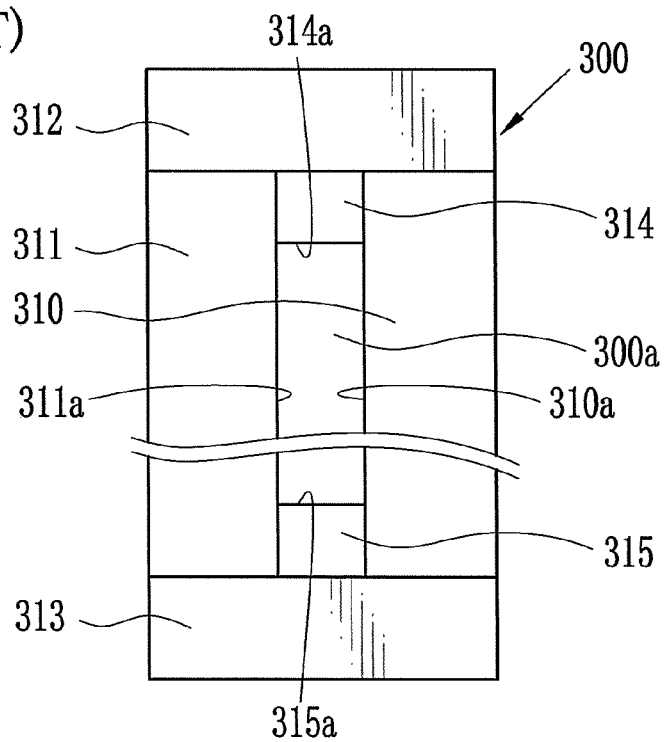
FIG. 13 is a plan view of a bottom of the casting die of the prior art in FIG. 12.

Further, in these two embodiments, the distance between the contact faces of the inner deckle plates becomes larger near the outlet. However, the present invention is not restricted in them. As shown in FIG. 11, a casting die 600 of the third embodiment may be used in the present invention. The casting die 600 has inner deckle plates 623, 624, a manifold 615, a slit 616 and an outlet 600*a*. The inner deckle plates 623, 624 respectively has contact faces 623*a*, 624*a*, and a distance W1 between the contact faces 623*a*, 624*a* becomes larger at a predetermined ratio from an upstream end of the slit 616, while the slit 616 is connected at the upstream end to the manifold 615.

In this embodiment, the inner deckle plates are plate members. However, the present invention is not restricted in it. Therefore, other types of inner deckle members may be used independent from the shape thereof, if the inner deckle members have contact faces for regulating the width of the casting dope to be discharged from the outlet.

In the present invention, the casting film 16 formed of the casting belt 44 is dried so as to have the self supporting properties. However, the present invention is not restricted in it. For example, the present invention may be applied to a solution casting method, in which a gelation is made by cooling the casting film 16, such that the casting film 16 may have the self supporting property. Especially, in the method of the gelation by cooling, the time necessary for occurrence of the self supporting property is shorter than in the method of drying the casting film, and the bad effects by the rapid cooling are not large. Therefore, the method of the gelation is adequate to the high speed film production. Further, the casting belt 44 (see, FIG. 3) running continuously is used as the support in the above embodiments. However, the present invention is not restricted in it. The support maybe a casting drum to be rotated axially.

In the solution casting method of the present invention, there are casting methods for casting plural dopes, for example, a co-casting method and a sequential casting method. In the co-casting method, a feed block may be attached to the casting die as in this embodiment, or a multi-manifold type casting die (not shown) may be used. In the production of the film having multi-layer structure, the plural dopes are cast onto a support to form a casting film having a first layer (uppermost layer) and a second layer (lowermost layer). Then in the produced film, at least one of the thickness of the first layer and that of the lowermost layer opposite thereto is preferably in the range of 0.5% to 30% of the total film thickness. Furthermore, when it is designated to perform the co-casting, a dope of higher viscosity is sandwiched by lower-viscosity dopes. Concretely, it is preferable that the dopes for forming the surface layers have lower viscosity than the dope for forming a layer sandwiched by the surface layers. Further, when the co-casting is designated, it is preferable in the dope bead between a die slit (or die lip) and the support that the composition of alcohol is higher in the two outer dopes than the inner dope.

Japanese Patent Laid-Open Publication No. 2005-104148 describes from [0617] to [0889] in detail about the structures of the casting die, the decompression chamber, the support and the like, and further about the co-casting, the peeling, the stretching, the drying conditions in each process, the handling method, the curling, the winding method after the correction of planarity, the solvent recovering method, the film recovering method. The descriptions thereof can be applied to the present invention.

[Properties & Measuring Method]
(Degree of Curl & Thickness)

Japanese Patent Laid-Open Publication No. 2005-104148 describes from [0112] to [0139] about the properties of the wound cellulose acylate film and the measuring method thereof. The properties and the measuring methods can be applied to the present invention.

[Surface Treatment]

The cellulose acylate film is preferably used in several ways after the surface treatment of at least one surface. The preferable surface treatments are vacuum glow discharge, plasma discharge under the atmospheric pressure, UV-light irradiation, corona discharge, flame treatment, acid treatment and alkali treatment. Further it is preferable to make one of these sorts of the surface treatments.

[Functional Layer]
(Antistatic, Curing, Antireflection, Easily Adhesive & Antiglare Layers)

The cellulose acylate film may be provided with an undercoating layer on at least one of the surfaces, and used in the several ways.

It is preferable to use the cellulose acylate film as a base film to which at least one of functional layers may be provided. The preferable functional layers are an antistatic layer, a cured resin layer, an antireflection layer, an easily adhesive layer, an antiglare layer and an optical compensation layer.

Conditions and Methods for forming the functional layer are described in detail from [0890] to [1087] of Japanese Patent Laid-Open Publication No. 2005-104148, which can be applied to the present invention. Thus, the produced film can have several functions and properties.

These functional layers preferably contain at least one sort of surfactants in the range of 0.1 mg/m$^2$ to 1000 mg/m$^2$. Further, the functional layers preferably contain at least one sort of plasticizers in the range of 0.1 mg/m$^2$ to 1000 mg/m$^2$. The functional layers preferably contain at least one sort of matting agents in the range of 0.1 mg/m$^2$ to 1000 mg/m$^2$. The functional layers preferably contain at least one sort of antistatic agents in the range of 1 mg/m$^2$ to 1000 mg/m$^2$.

(Variety of Use)

The produced cellulose acylate film can be effectively used as a protection film for a polarizing filter. In the polarizing filter, the cellulose acylate film is adhered to a polarizer. Usually, two polarizing filters are adhered to a liquid crystal layer such that the liquid crystal display may be produced. Note that the arrangement of the liquid crystal layer and the polarizing filters are not restricted in it, and several arrangements already known are possible. Japanese Patent Laid-Open Publication No. 2005-104148 discloses the liquid crystal displays of TN type, STN type, VA type, OCB type, reflective type, and other types in detail. The description may be applied to the present invention. Further, in this publication No. 2005-104148 describes a cellulose acylate film provided with an optical anisotropic layer and that having antireflection and antiglare functions. Further, the produced film can be used as an optical compensation film since being double axial cellulose acylate film provided with adequate optical properties. Further, the optical compensation film can be used as a protective film for a polarizing filter. The detail description thereof is made from [1088] to [1265] in the publication No. 2005-104148.

In the method of forming the polymer film of the present invention, the formed cellulose acylate film is excellent in optical properties. The TAC film can be used as the protective film for the polarizing filter, a base film of the photosensitive material, and the like. Further, in order to improve the view angular dependence of the liquid crystal display (used for the television and the like), the produced film can be also used for the optical compensation film. Especially, the produced film is effectively used when it doubles as protective film for the polarizing filter. Therefore, the film is not only used in the TN-mode as prior mode, but also IPS-mode, OCB-mode, VA-mode and the like. Further, the polarizing filter may be constructed so as to have the protective film as construction element.

Further, the present invention is not restricted to the production of the optical film, and applied to the production of any film by the solution casting method. For example, the present invention is applied to the production of a solid electrolyte film as a proton transmitting material to be used for a fuel cell. Note that the polymer to be used in the present invention is not restricted in the cellulose acylate, but may be any polymer already known.

[Experiment]

The experiment of the present invention was made, whose explanation will be made in followings. In this experiment, five examples of the film production were performed. Examples 1 & 2 were the examples of the present invention, and Examples 3-5 were the comparisons to Examples 1 & 2. The explanation of Example 1 will be made in detail, and the explanation of the same things in the explanations of Examples 2-5 will be omitted.

EXAMPLE 1

The explanation of Example 1 is made now. The compositions for the preparation of the dope to be used for the film production were as follows:

| <Solid Compounds> | |
|---|---|
| Cellulose Triacetate (Degree of substitution, 2.8) | 89.3 wt. % |
| Plasticizer A (triphenyl phosphate) | 7.1 wt. % |
| Plasticizer B (biphenyldiphenyl phosphate) | 3.6 wt. % |
| <Solvent> | |
| Dichloromethane (first component of solvent) | 92 wt. % |
| Methanol (second component of solvent) | 8 wt. % |

The solvent for the dope contained the first and second components of solvent, as described above. The solid compounds were added to the solvent adequately, such that the dope 11 was obtained. Note that the solid content in the obtained dope 11 were 19.3 wt. %. Then the dope 11 was filtrated with use of a filter (#63LB, produced by Toyo Roshi Kaisha, Ltd.), and further filtrated with use of a sintered metallic filter (06N, porous diameter 10 μm, produced by Nippon Seisen, Co., Ltd.). Furthermore, the dope 11 was filtrated with use of a mesh filter, and then stored in the stock tank 39.

<Cellulosetriacetate>

According to cellulose triacetate used in this experiment, the remaining content of acetic acid was at most 0.1 wt. %, the Ca content was 5 ppm, the Mg content was 70 ppm, the Fe content was 0.5 ppm, the free acetic acid was 40 ppm, and the sulfuric ion content was 15 ppm. The degree of acetylation at $6^{th}$ position was 0.91, and the percentage of acetyl groups at $6^{th}$ position to the total acetyl groups was 32.5%. The acetone extract was 8 wt. %, and a ratio of weight-average molecular weight to number-average molecular weight was 2.5. Further, yellow index was 1.7, haze was 0.08, and transparency was 93.5%. This cellulose triacetate is synthesized from cellulose as material obtained from cotton, and called cotton TAC in the following explanation.

<Preparation for Liquid of Matting Agent>

The matting agent liquid was prepared so as to contain the following compound, while the TAC was the same as that for the preparation of the dope 11:

| Silica (Aerosil R972, produced by Nippon Aerosil Co., Ltd.) | 0.67 wt. % |
|---|---|
| Cellulose triacetate | 2.93 wt. % |
| Triphenyl phosphate | 0.23 wt. % |
| Biphenyldiphenyl phosphate | 0.12 wt. % |
| Dichloromethane | 88.37 wt. % |
| Methanol | 7.68 wt. % |

The dispersion of the mixture of the above compounds was made with use of the attritor such that the average particle diameter in volume might be 0.7 μm. Thus the liquid of matting agent was prepared and then filtered with use of Astropore filter (produced by Fuji Photo Film Co., LTD.), and then stored in the matting agent tank.

| <Preparation for Liquid of UV Absorbing Agent> | |
|---|---|
| UV-agent A (2(2'-hydroxy-3',5'-di-tert-butylphenyl)-5-chlorobenzotriazol) | 5.83 wt. % |
| UV-agent B (2(2'-hydroxy-3',5'-di-tert-amylphenyl)benzotriazol) | 11.66 wt. % |
| Cellulose triacetate | 1.48 wt. % |
| Triphenyl phosphate | 0.12 wt. % |
| Biphenyldiphenyl phosphate | 0.06 wt. % |
| Dichloromethane | 74.38 wt. % |
| Methanol | 6.47 wt. % |

The prepared liquid of UV absorbing agent was filtered with use of Astropore filter (produced by Fuji Photo Film Co., LTD.), and then stored in the UV agent tank.

Further, a mixture solvent A was prepared so as to contain 86.5 pts.wt. of dichloromethane, 13 pts.wt. of methanol, 0.5 pts.wt. of 1-butanol.

The liquid of matting agent was added to the liquid of UV absorbing agent, and the mixture was stirred by a static mixer, such that the additive liquid was obtained. The pump 58 was driven to feed the dope 11 through the pipe 61, and the dope 11 was filtrated by the filtration device 59. Then the additive liquid was added to the dope 11, and the mixing of the dope 11 and the additive liquid was made by the static mixer 60. Thus the casting dope 14 was obtained.

The film 22 was produced with use of the film production line 40 shown in FIG. 2. The pump 58 increases the pressure in the primary side, and the dope 11 was fed with a feedback control to the upstream side from the pump with use of an inverter motor, such that the pressure in the primary side may be 0.8 MPa. As for the efficiencies of the pump 58, the volume efficiency was at most 99.2%, fluctuation percentage of the discharge volume was at most 0.5%. Further, the pressure for discharging was 1.5 MPa.

The casting die 41 included the lip plates 210, 211, the side plates 218, 219, the inner deckle plates 223, 224, while these members of the casting die 41 was formed of SUS316 whose percentage of the volume fluctuation was 0.002%. As for the finish accuracy of the contact faces 210a, 211a, 223a, 224a of the lip plates 210, 211 and the inner deckle plates 223, 224, the surface roughness was at most 1 μm and the straightness was at most 1 μm in any directions. Further, as for the protruding in the edges of the outlet 41a, the distances CL1-CL4 were at most 2 μm.

The flow rate of the casting dope 14 near the outlet 41a in the casting die 41 was controlled. The casting width of the casting dope 14 from the outlet 41a of the casting die 41 was 1700 mm. The casting speed was in the range of 45 m/min to 55 m/min. The temperature of a heat transfer medium was controlled to 36° C. at the entrance of the jacket, such that the temperature of the casting dope 14 may be controlled to 36° C.

In this experiment, the sizes of the lip plates 210, 211 and the inner deckle plates 223, 224 and the change of the sizes were measured with use of a microscope whose resolution was 1 μm.

The temperatures of casting die 41 and the pipe were controlled to 36° C. during the film production. The casting die 41 was the coat hunger type, in which heat bolts for adjusting the film thickness were disposed at the pitch of 20 mm. Thus the film thickness (or the thickness of the dopes) is automatically controlled by the heat bolt. A profile of the heat volt can be set corresponding to the flow rate of a pump (not shown), on the basis of the preset program. Thus the feed back control can be made by the control program on the basis of the profile of an infrared ray thickness meter (not shown) disposed in the film production line 40. The control was made such that, with exception of both side edge portions (20 mm each in the widthwise direction of the produced film), the difference of the film thickness between two positions (50 mm apart from each other) might be at most 1 μm, and the largest difference between the minimal values of the film thickness in the widthwise direction might be at most 3 μm/m. Further, the average film thickness might was controlled in ±1.5%.

The primary side (namely the upstream side) of the casting die 41 is provided with the decompression chamber 85. The decompression rate of the decompression chamber 85 was controlled in accordance with the casting speed, such that the pressure difference might occur in the range of one Pa to 5000 Pa between the upstream and downstream sides of the dope bead of the discharged casting dope above the casting belt 44. At this time, the pressure difference between both sides of the dope bead was determined such that the length of the dope bead might be from 20 mm to 50 mm. Further, an instrument was provided such that the temperature of the decompression chamber 85 might be set to be higher than the condensation temperature of the gas around the casting section. Further, there were labyrinth packing (not shown) in the upstream and downstream sides of the dope beads.

The material of the lip plates 210, 211, the side plates 218, 219, and the inner deckle plates 223, 334 was the stainless steel, whose coefficient of thermal expansion was at most $2 \times 10^5$ (° C.$^{-1}$). In the compulsory corrosion experiment in an electrolyte solution, the corrosion resistance was almost the same as that of SUS316. Further, the material to be used for the casting die 41 had enough corrosion resistance, such that the pitting (or pitting corrosion) might not occur on the gas-liquid interface even if this material were dipped in a mixture liquid of dichloromethane, methanol and water for three months. The finish accuracy of the contact surface of each casting die to the casting dope 14 was at most 1 μm in surface roughness, and the slit clearance was adjusted to 1.5 mm in straightness. According to an edge of the contact portion of a lip end of the casting die 41, R is at most 50 μm in all of a width. Further, the shearing rate in the casting die 41 controlled in the range of one to 5000 per second. Further, the WC coating was made on the lip end from the casting die 41 by a melt extrusion method, so as to provide the hardened layer.

The casting belt 44 was a stainless belt which was 1.9 m in width and 70 m in length. The thickness of the casting belt 44 was 1.5 mm, and the surface of the casting belt 44 was polished, such that the surface roughness might be at most 0.05 μm. The material was SUS316, which had enough corrosion resistance and strength. The thickness unevenness of the entire casting belt 44 was at most 0.5% of the predetermined value. The casting belt 44 was moved by rotating the back-up rollers 42, 43. In this experiment, the control was made such that the difference of the relative speed of the casting belt 44 to the back-up rollers 42, 43 was at most 0.01 m/min. Further the control was made such that the variation of the speed of the casting belt 44 was at most 0.5% to the predetermined value. The position of the belt in the widthwise direction was controlled with detection of the position of the side end, such that meandering in one circle of the casting belt 44 which is running was reduced in 1.5 mm. Further, below the casting die 41, the variation of the position in the vertical direction between the lip end of the casting die 41 and the casting belt 44 was in 200 μm.

In this experiment, the back-up rollers 42, 43 were supplied therein with a heat transfer medium, such that the temperature of the casting belt 44 might be controlled. The back-up roller 43 disposed in a side of the casting die 41 was supplied with the heat transfer medium (water) at 5° C., and the back-up roller 42 was supplied with the heat transfer medium (water) at 40° C. The surface temperature of the middle portion of the casting belt 44 at a position just before the casting was 15° C., and the temperature difference between both sides of the belt was at most 6° C. Note that a number of pinhole (diameter, at least 30 μm) was zero, a number of pinhole (diameter, at least 10 μm and less than 30 μm) was at most one in square meter, and a number of pinhole (diameter, less than 10 μm) was at most two in square meter.

At first, the drying air was fed out in parallel to the casting film 16 so as to make the drying. Further, the drying air at 140° C. was fed out from the upstream air duct 87a to dry the casting film 16, the drying air at 140° C. was fed out from the downstream air duct 87b to dry the casting film 16, and the drying air at 65° C. was fed out from the lower air duct 87c to dry the casting film 16. Note that the oxygen concentration in the drying atmosphere on the casting belt 44 was kept to 5 vol % by substituting the air for nitrogen gas. In order to keep the oxygen concentration to 5 vol %, the inner air of the drying atmosphere was substituted by nitrogen gas. The solvent vapor in the casting chamber 81 was recovered by setting the temperature of exit of the condenser 82 to −3° C.

The static fluctuation near the casting die 41 was reduced to at most ±1 Pa. When the casting film 16 has the self-supporting property, the casting film 16 was peeled as the wet film 18 from the casting belt 44 with support of the roller 89. In order to reduce the peeling defects, the percentage of the peeling speed (the draw of the peeling roller) to the speed of the casting belt 44 was controlled from 100.1% to 110%. The solvent vapor generated in the evaporation is condensed by the condenser 86 at −3° C. to a liquid state, and recovered by the recovering device 83. The water content of the recovered solvent was adjusted to at most 0.5%. Further, the air from which the solvent components were removed was heated again and reused for the drying air. The wet film 18 was transported with the rollers in the transfer area 90 toward the tenter dryer 45. In the transfer area 90, the drying air at 60° C. was fed to the wet film 18 from the air blower 91. A tenter draw as a magnitude of the film length from the roller 89 to the entrance of the tenter dryer 45 was 103.0%.

In the tenter dryer 45, both side edge portions of the wet film 18 were clipped or held by the clips, and the wet film 18 was transported through the temperature zones. During the transport in the tenter dryer 45, the predetermined stretching and drying were made to the wet film 18, and thereafter the wet film was fed out as the film 22 from the tenter dryer 45 to the edge slitting device 46.

The solvent vapor evaporated in the tenter dryer 45 was condensed and liquidized at −3° C. by a condenser (not shown) for recovery of the solvent. Thereafter the water content of the recovered solvent was adjusted to at most 0.5 wt. %.

In 30 seconds from exit of the tenter dryer 45, both side edge portions of the film 22 were slit off in the edge slitting device 46. In this experiment, each side portion of 50 mm in the widthwise direction of the film 22 was determined as the side edge portion, which were slit off by an NT type slitter of the edge slitting device 46. The slit side edge portions were sent to the crusher 93 by applying air blow from a blower (not shown), and crushed to tips about 80 mm$^2$. The tips were stored into edge silos for reusing as raw material with the TAC flakes for the dope production. Before the drying at the high temperature in the drying chamber 47, the pre-heating of the film 22 was made in a pre-heating chamber (not shown) in which the air blow at 100° C. was supplied.

The film 22 was dried at high temperature in the drying chamber 47, which was partitioned into four partitions. Air blows whose temperatures were 120° C., 130° C., 130° C. and 130° C. from the upstream side were fed from air blowers (not shown) to the partitions. The transporting tension of each roller 100 to the film 22 was 100 N/m. The drying was made for ten minutes such that the content of the remaining solvent might be 0.3 wt. %. The lapping angle of some of the rollers 100 was 80° and that of the others was 190°. The rollers 100 were made of aluminum or carbon steel. On the surface, the hard chrome coating was made. The surfaces of the rollers 100 were flat or processed by blast of matting process. The swing of the roller in the rotation was in 50 μm. Further, the bending of each roller 100 at the tension of 100 N/m was reduced to at most 0.5 mm.

The solvent vapor contained in the drying air is removed with use of the adsorbing device 101 in which an adsorbing agent was used. The adsorbing agent was active carbon, and the desorption was performed with use of dried nitrogen. The recovered solvent was reuse as the solvent for the dope preparation after the water content might be at most 0.3 wt. %. The drying air contains not only the solvent vapor but also gasses of the plasticizer, UV-absorbing agent, and materials of high boiling points. Therefore, a cooler for removing by cooling and a preadsorber were used to remove them. Thus the drying air was reused. The ad- and desorption condition was set such that a content of VOC (volatile organic compound) in exhaust gas might be at most 10 ppm. Furthermore, in the entire solvent vapor, the solvent content to be recovered by condensation method was 90 wt %, and almost of the remaining solvent vapor was recovered by the adsorption recovering.

The dried film 22 was transported into a first humidity control chamber (not shown). Between the drying chamber 47 and the first humidity control chamber, there was the transfer area 90 into which a drying air at 110° C. was fed. In the first humidity control chamber, an air whose temperature and dewing point were respectively 50° C. and 20° C. was fed. Further, the film 22 was transported into a second humidity control chamber (not shown) for preventing the curling of the film 22. In the second humidity control chamber, an air whose temperature and humidity were respectively 90° C. and 70% was directly applied.

After the humidity control, the film 22 was cooled in the cooling chamber 48 such that the temperature of the film might be at most 30° C. Then the edge slitting of both film edge portions were made. Further, the compulsory neutralization device (or neutralization bar) 102 eliminated the charged electrostatic potential of the film 22 in the range of −3 kV to +3 kV. After the neutralization, the embossing of both side portions of the film 22 was made by the knurling rollers 103 to provide the knurling. The knurling area was 10 mm in width, and the knurling pressure was determined such that the maximal emboss height might be 12 μm in average larger than the averaged thickness.

The film 22 was transported to the winding chamber 49, whose inside temperature and humidity were respectively kept to 28° C. and 70%. Further, a compulsory neutralization device (not shown) was provided, such that the charged electrostatic potential of the film might be in the range of −1.5 kV to +1.5 kV. The film 22 was wound up around the winding shaft 110 with use of the press roller, such thus the film roll might be obtained. The thickness of the film 22 was 70 μm and the width was 1500 mm.

EXAMPLE 2

The casting die included the inner deckle plates produced of ceramics whose percentage of the volume fluctuation was 0.002%. Other conditions were the same as Example 1, and the film 22 was produced by the solution casting method.

EXAMPLE 3

On the lip end of the casting die 41, the distances CL1-CL4 of the protrusion on the edge of the outlet 41a were at least 10 μm. Other conditions were the same as Example 1, and the film 22 was produced by the solution casting method.

EXAMPLE 4

On the lip end of the casting die 41, the distances CL1-CL4 of the protrusion on the edge of the outlet 41a were at least 30 μm. Other conditions were the same as Example 1, and the film 22 was produced by the solution casting method.

EXAMPLE 5

The casting die included the inner deckle plates produced of Teflon (registered trade mark) whose percentage of the volume fluctuation was 2%. Other conditions were the same as Example 1, and the film 22 was produced by the solution casting method.

[Estimation of Film]

As for the above examples, the estimation of the produced film 22 was made in the points of the occurrence of the skinning and the smoothness of the film surface. The methods of the estimations will be described below. Note that the estimation was made in the same manner through all of Examples 1-5, and the results of the estimations are shown in Table 1.

[Estimation (1): Observation of Skinning]

In the casting process, when the casting dope was discharged from the casting die, the surface of the casting dope was observed with eyes whether the skinning occurred. The estimation was A when the skinning was not observed. The estimation was B when the skinning was slightly observed but the film was usable. The estimation was C when the skinning was too clearly formed and the film was not usable.

[Estimation (2): Smoothness of Film Surface]

A film sample was cut off from the obtained film in each Example 1-5 so as to have a size of 1.5 m in the lengthwise direction and the film width in the widthwise direction. Thus the film sample has the same width as the obtained film. The reflection light was illuminated on the film sample, and the unevenness on the film surface was observed. The estimation was A when no unevenness was observed. The estimation was B when the unevenness was slightly observed but the film was usable. The estimation was C when the skinning was too clearly formed and the film was not usable.

TABLE 1

| | Estimation | |
|---|---|---|
| | (1) | (2) |
| Example 1 | A | A |
| Example 2 | A | A |
| Example 3 | C | C |
| Example 4 | C | C |
| Example 5 | C | C |

As shown in Table 1, the produced film has the excellent smoothness of the film surface in Examples 1 & 2 to which the present invention was applied. Further, since the occurrence of the skinning was reduced in the casting process, the cleansing of the devices and the members (for example the casting die, the casting belt and the like) in the casting chamber were not necessary, and therefore the productivity of the solution casting method becomes higher. However, the film surface of the produced film in each Example 3-5 had unevenness and the smoothness was not adequate to the film product. Further, since the skinning often occurred, the cleansing of the devices and the members in the casting chamber had to be made, and the productivity of the solution casting method becomes lower.

As the results, the casting die of the present invention can prevent the occurrence of the skinning, and the film excellent in the smoothness can be produced effectively the solution casting method and the solution casting apparatus in which the casting die is used.

Various changes and modifications are possible in the present invention and may be understood to be within the present invention.

What is claimed is:

1. A solution casting method, comprising steps of:
providing a casting device for flowing out a dope from a slit, said casting device including a pair of first slit members forming first walls of said slit and a pair of second slit members forming second walls of said slit, said first walls extending in a lengthwise direction of said slit, said second walls extending in a widthwise direction of said slit, a protrusion length of a protrusion being at most 9 μm upon providing for said second slit member with said protrusion protruding from said first slit member in a flow-out direction of said dope or for said first slit member with said protrusion protruding from said second slit member in said flow-out direction;
running a support;
flowing out said dope from said slit so as to form a casting film;
peeling said casting film from said support; and
drying said peeled casting film to a film,
wherein a pair of side plates is respectively disposed along respective outer surfaces of said second slit members in said widthwise direction of said slit.

2. The method of claim 1, wherein said pair of first slit members is constructed of a pair of lip plates disposed oppositely, so as to form a distance of a predetermined length, said pair of second slit members is constructed of inner deckle plates, and said inner deckle plates are disposed in a space surrounded by said lip plates and said side plates.

3. The method of claim 2, wherein said lip plates and said side plates are formed of stainless steel, and said inner deckle plates are formed of ceramics.

4. The method of claim 1, wherein each of said second slit members has a widening surface such that a flow width of said dope may be larger in a downstream side of a flow of said dope.

5. The method of claim 1, wherein said pair of second slit members are provided between said first slit members.

6. The method of claim 1, wherein said pair of first slit members comprise contact faces that contact said dope, and said pair of second slit members comprise contact faces that contact said dope.

7. The method of claim 1, wherein said side plates do not contact said dope.

8. The method of claim 1, wherein said pair of side plates is respectively dispersed along outer surfaces of said first walls in said widthwise direction of said slit.

9. The method of claim 1, wherein said pair of second slit members are provided between said side plates.

* * * * *